United States Patent
Rodriguez et al.

(10) Patent No.: US 11,117,213 B2
(45) Date of Patent: Sep. 14, 2021

(54) FRICTION STIR ADDITIVE MANUFACTURING SYSTEMS

(71) Applicant: The Boeing Company, Chicago, IL (US)

(72) Inventors: Rogie I. Rodriguez, Huntsville, AL (US); Bruno Zamorano Senderos, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 348 days.

(21) Appl. No.: 16/220,346

(22) Filed: Dec. 14, 2018

(65) Prior Publication Data

US 2020/0189025 A1 Jun. 18, 2020

(51) Int. Cl.
*B23K 20/00* (2006.01)
*B23K 20/12* (2006.01)
*B33Y 80/00* (2015.01)
*B33Y 10/00* (2015.01)
*B33Y 30/00* (2015.01)
*B33Y 40/00* (2020.01)

(52) U.S. Cl.
CPC ...... *B23K 20/1215* (2013.01); *B23K 20/1205* (2013.01); *B23K 20/128* (2013.01); *B23K 20/1255* (2013.01); *B23K 20/129* (2013.01); *B33Y 10/00* (2014.12); *B33Y 30/00* (2014.12); *B33Y 40/00* (2014.12); *B33Y 80/00* (2014.12)

(58) Field of Classification Search
CPC ............ B23K 20/1215; B23K 20/1245; B23K 20/1205; B23K 20/125; B23K 20/127; B33Y 10/00; B33Y 30/00; B33Y 80/00; B33Y 40/00
See application file for complete search history.

(56) References Cited

U.S. PATENT DOCUMENTS

| 8,397,974 B2 | 3/2013 | Schultz et al. |
| 8,632,850 B2 | 1/2014 | Schultz et al. |
| 8,636,194 B2 | 1/2014 | Schultz et al. |
| 8,875,976 B2 | 11/2014 | Schultz et al. |
| 2007/0040006 A1* | 2/2007 | Charles R. .......... B23K 20/1275 228/112.1 |
| 2008/0128472 A1* | 6/2008 | Park ................... B23K 20/1255 228/2.1 |
| 2012/0279442 A1* | 11/2012 | Creehan ................. C23C 24/06 118/76 |
| 2018/0085849 A1 | 3/2018 | Kandasamy et al. |

* cited by examiner

Primary Examiner — Erin B Saad
(74) Attorney, Agent, or Firm — Walters & Wasylyna LLC

(57) ABSTRACT

An additive manufacturing system for depositing an extrudate onto a substrate comprises a deposition head. The deposition head comprises a stirring tool, rotatable about an axis of rotation AR and comprising a tool distal end and a tool proximal end, axially opposing the tool distal end along the axis of rotation AR. The stirring tool defines a bore, extending from the tool proximal end to the tool distal end. The bore is configured to receive feedstock, biased toward the tool distal end. The deposition head also comprises a die, which is positioned adjacent to the stirring tool, defines a die axis AD1, and comprises a die distal end and a die proximal end, axially opposing the die distal end along the die axis AD1. The die axis AD1 is parallel with the axis of rotation AR of the stirring tool.

20 Claims, 13 Drawing Sheets

FRICTION STIR ADDITIVE MANUFACTURING SYSTEMS

TECHNICAL FIELD

The present disclosure generally relates to additive manufacturing and, more particularly, to additive manufacturing systems and methods for depositing an extrudate onto a substrate using friction stir deposition.

BACKGROUND

Objects, made using additive manufacturing techniques, are fabricated by adding material layer by layer. Friction stir additive manufacturing is a solid-state additive manufacturing technique based on friction stir welding. Additive friction stir deposition is a solid-state additive manufacturing technique that combines friction stir welding with a material feeding and deposition process. In additive friction stir deposition, feed material is delivered through a hollow friction stir tool. The friction stir tool rapidly rotates and generates heat through dynamic contact friction at a tool-material interface. Heat is generated by dynamic contact friction between the friction stir tool and a material, dissipated by plastic deformation of the material, and transferred inside the material by thermal conduction. Heated and softened, the feed material is fed through the friction stir tool and bonds with a substrate through plastic deformation at the interface. However, an uncontrolled flow of material, radiating outward from the deposition interface, may result in formation of areas having undesired, excess material. Formation of such excess material may lead to unfinished (e.g., rough or low quality) surface characteristics, inaccurate surface geometries, dimensions that are beyond acceptable tolerances, and/or other defects. Certain defects may require post-processing operations, which increase production cost. Certain other defects may require the object to be discarded, which increases waste. Accordingly, systems and methods, intended to address the above-identified concerns, would find utility.

SUMMARY

Accordingly, apparatuses and methods, intended to address at least the above-identified concerns, would find utility.

The following is a non-exhaustive list of examples, which may or may not be claimed, of the subject matter, disclosed herein.

One example of the subject matter, disclosed herein, relates to an additive manufacturing system for depositing an extrudate onto a substrate. The additive manufacturing system comprises a deposition head. The deposition head comprises a stirring tool, rotatable about an axis of rotation $A_R$ and comprising a tool distal end and a tool proximal end, axially opposing the tool distal end along the axis of rotation $A_R$. The stirring tool defines a bore, extending from the tool proximal end to the tool distal end. The bore is configured to receive feedstock. The feedstock is biased toward the tool distal end. The deposition head also comprises a die. The die is positioned adjacent to the stirring tool. The die defines a die axis $A_{D1}$. The die comprises a die distal end and a die proximal end, axially opposing the die distal end along the die axis $A_{D1}$. The die axis $A_{D1}$ is parallel with the axis of rotation $A_R$ of the stirring tool.

The additive manufacturing system provides a wide range of capabilities, including additive manufacturing, coating applications, component repair, metal joining, and custom metal alloy and metal matrix composite billet and part fabrication by depositing the extrudate onto the substrate. The die serves as a forming tool for controlling geometry and/or dimensions of the extrudate when deposited onto the substrate.

Another example of the subject matter, disclosed herein, relates to a method of depositing an extrudate onto a substrate. The method comprises rotating a stirring tool about an axis of rotation $A_R$ while urging a tool distal end of the stirring tool against the substrate. The stirring tool defines a bore, extending therethrough. The method further comprises positioning a die adjacent to the stirring tool, such that the stirring tool rotates relative to the die, and passing feedstock through the bore toward the tool distal end.

The method facilitates depositing layers of the extrudate onto the substrate to form a three-dimensional object. The die provides at least one of a flow-inhibiting function and a surface-forming function for controlling geometry and/or dimensions of a side, or a surface, of the extrudate when depositing the extrudate onto the substrate.

BRIEF DESCRIPTION OF THE DRAWINGS

Figure 1:
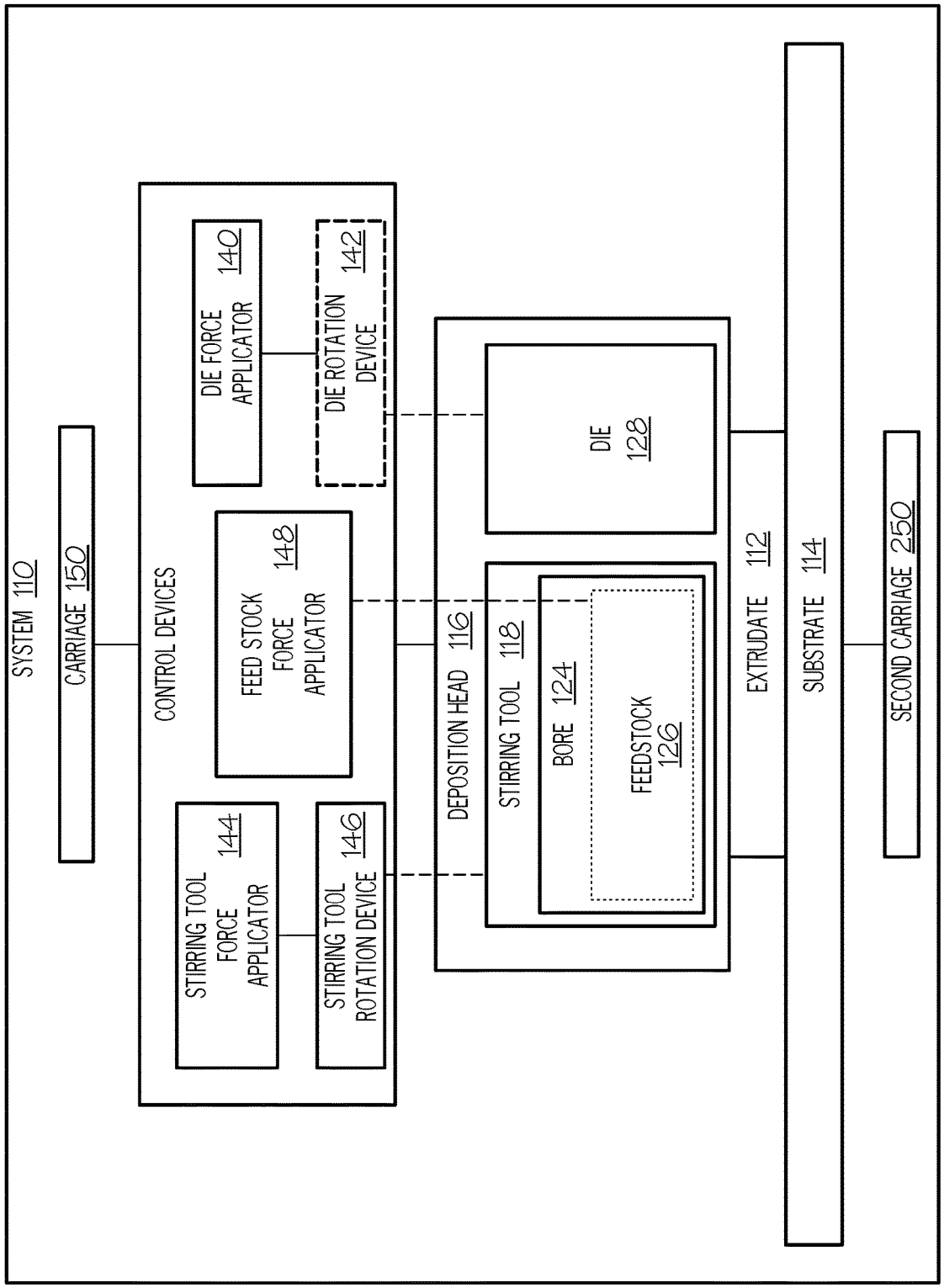
Figure 2:
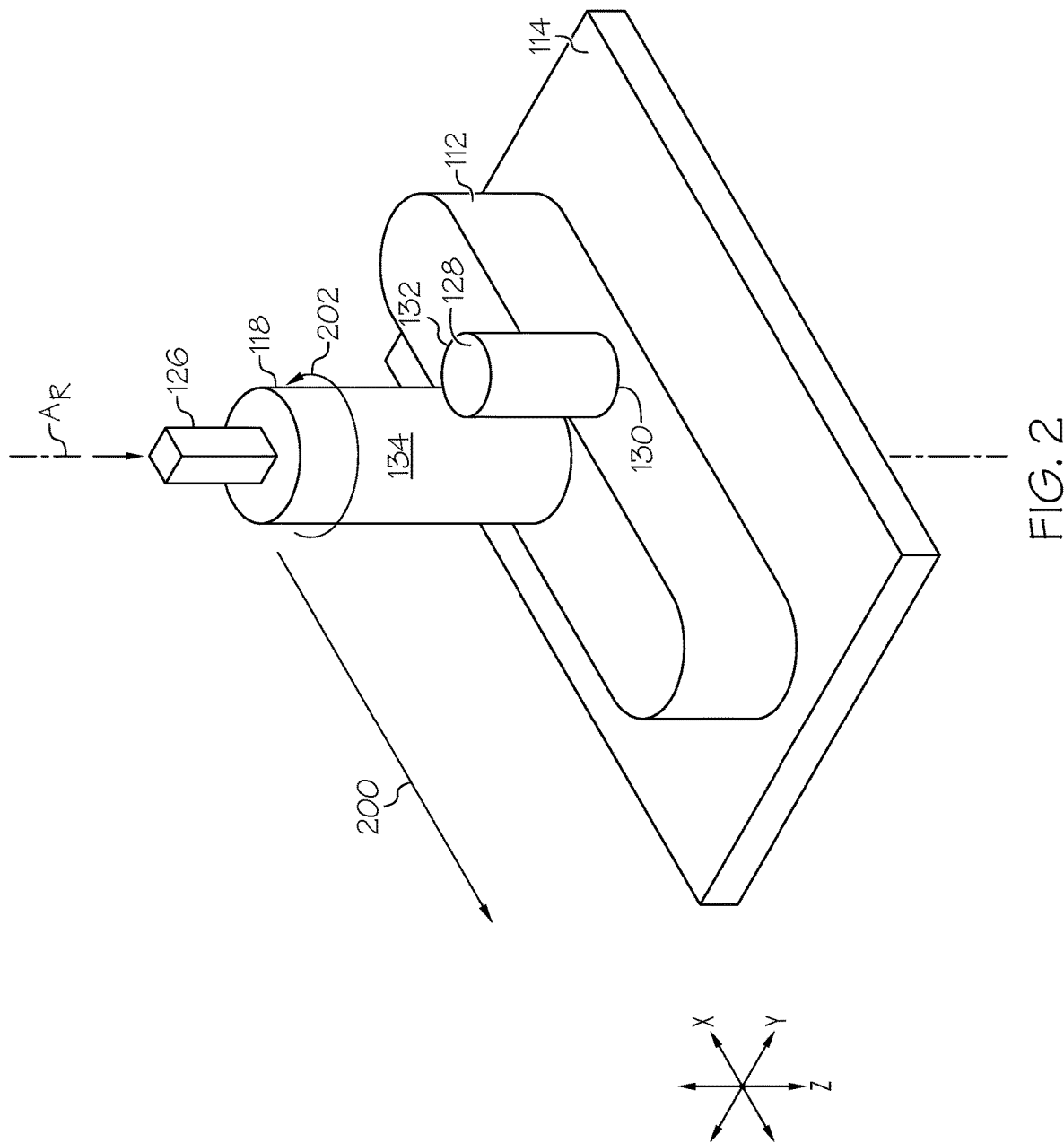
Figure 3:
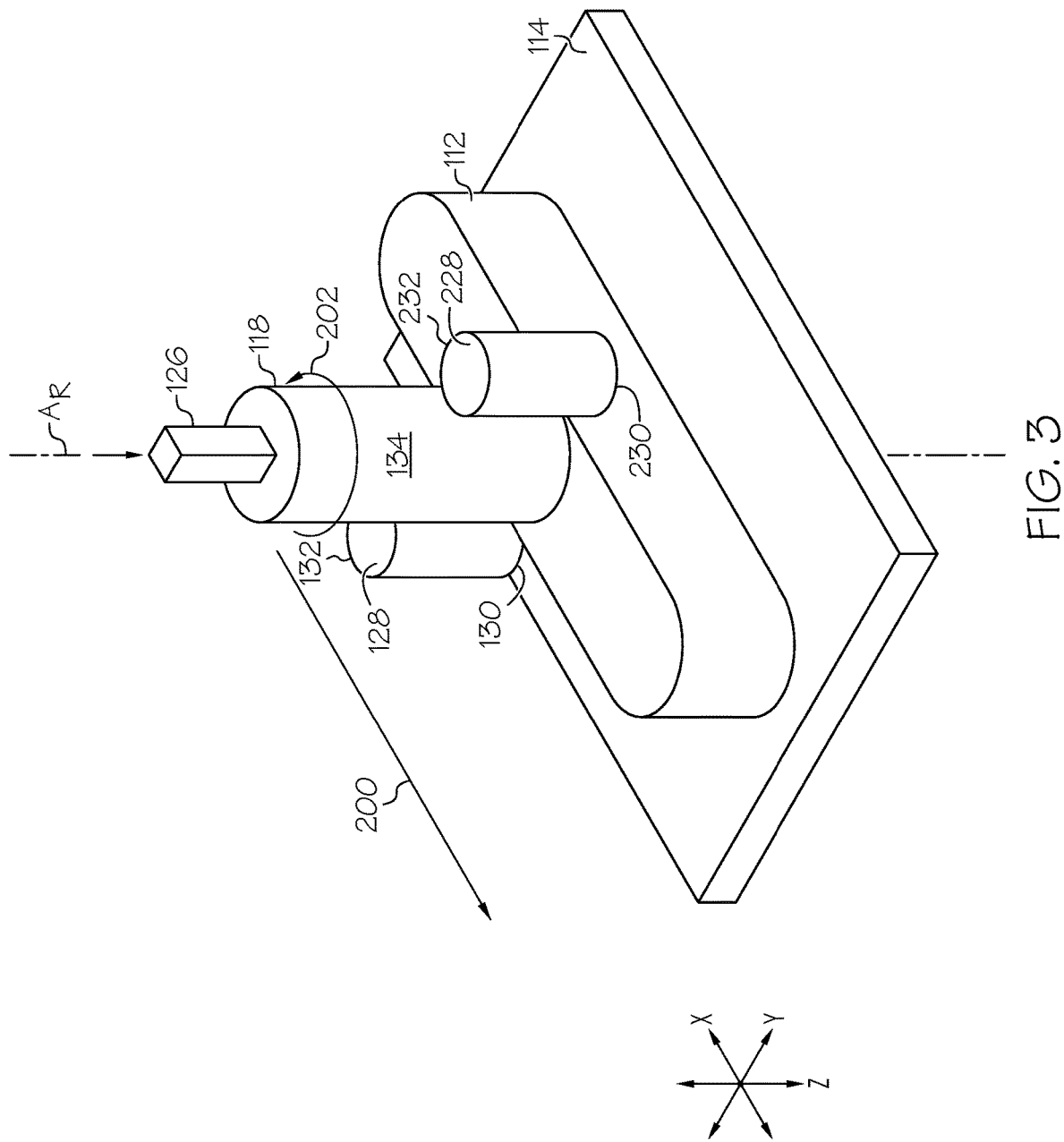
Figure 4:
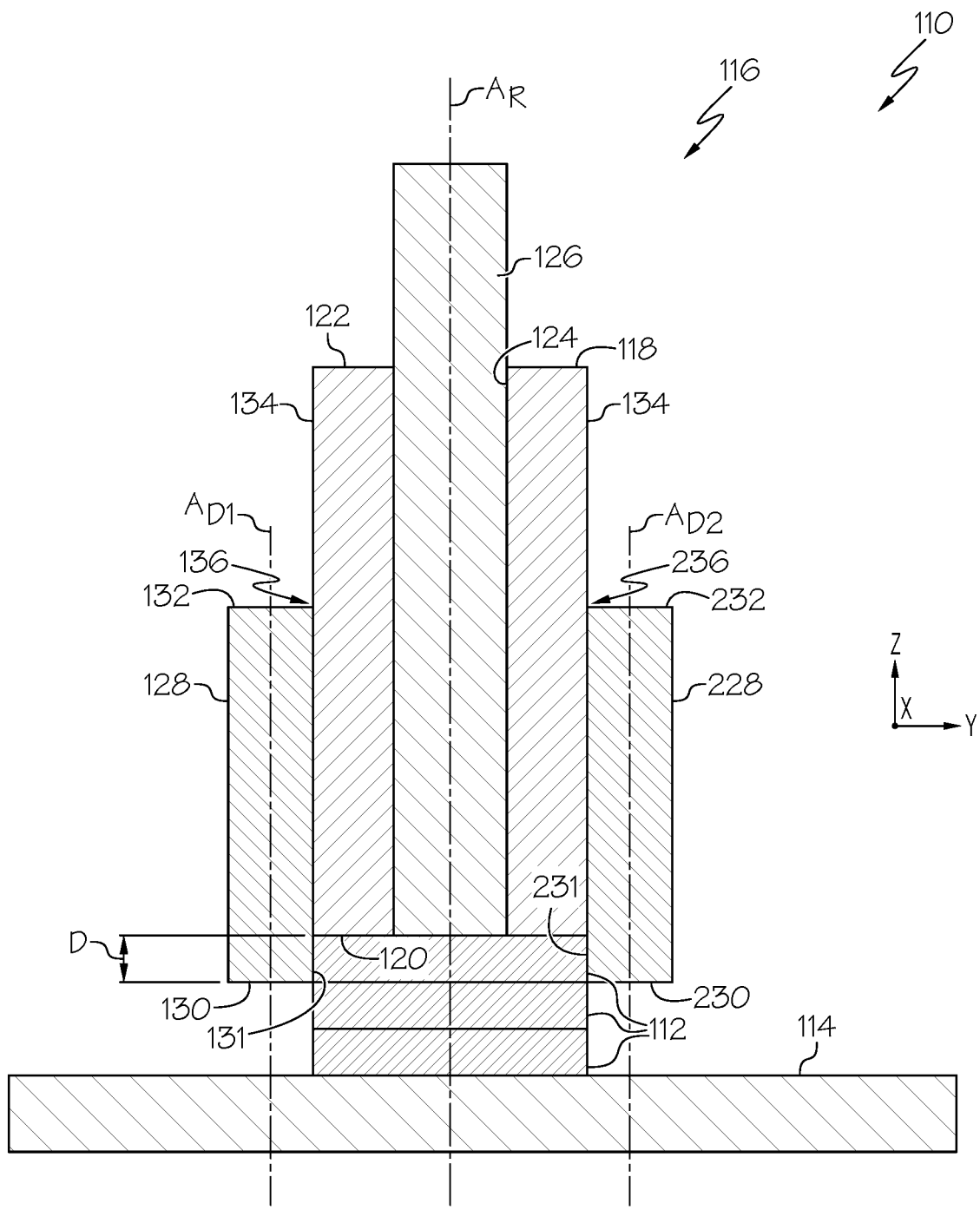
Figure 5:
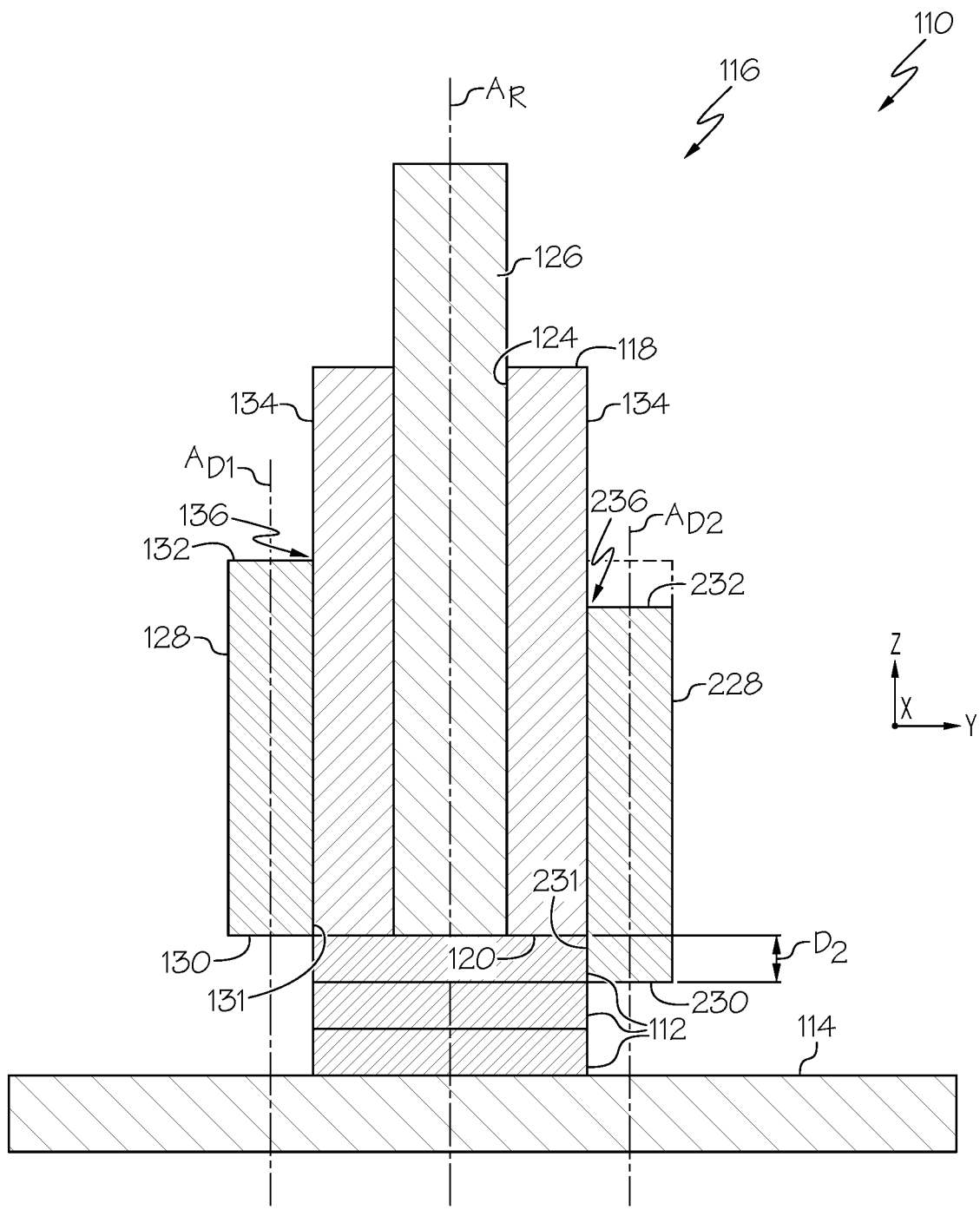
Figure 6:
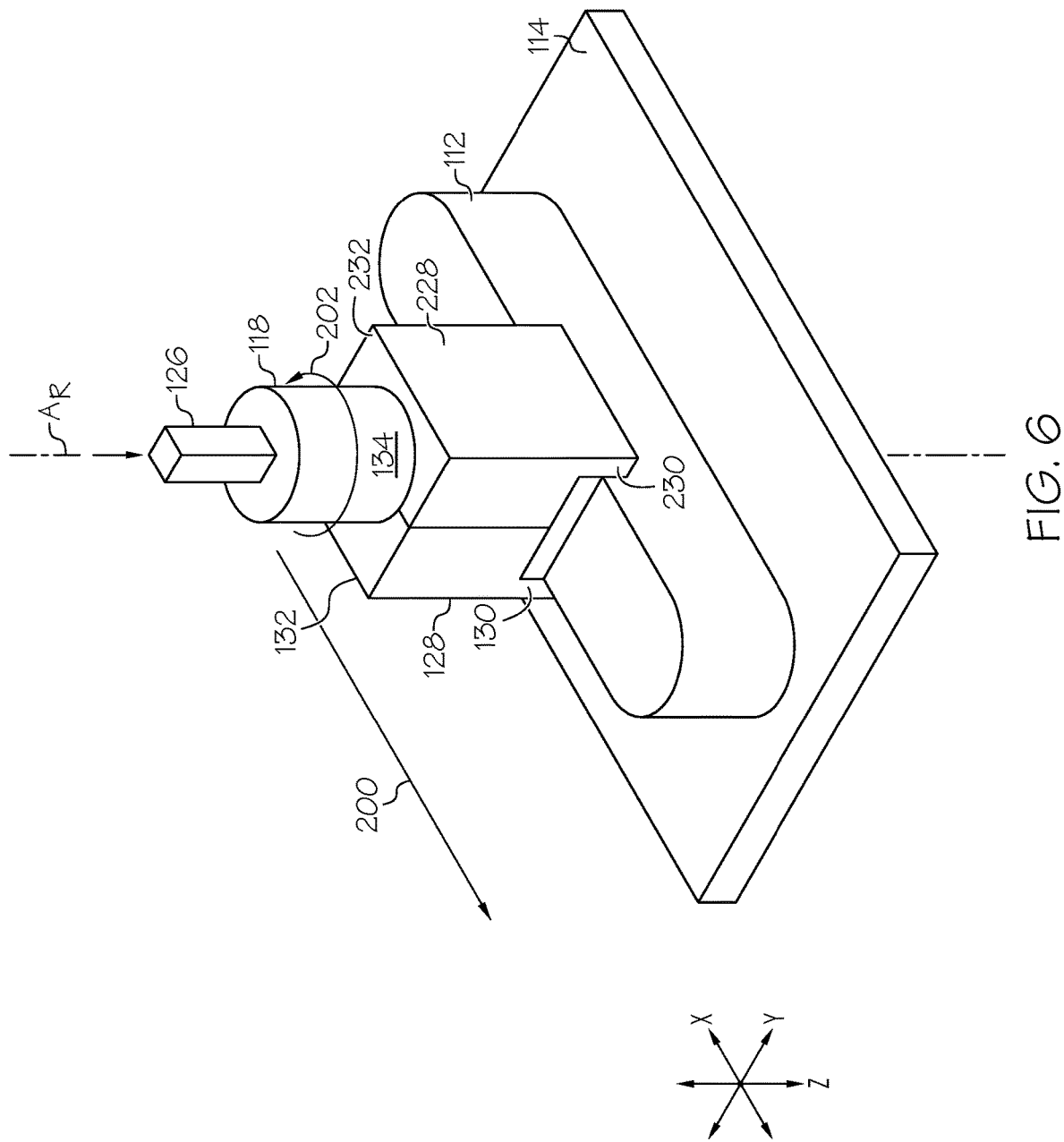
Figure 8:
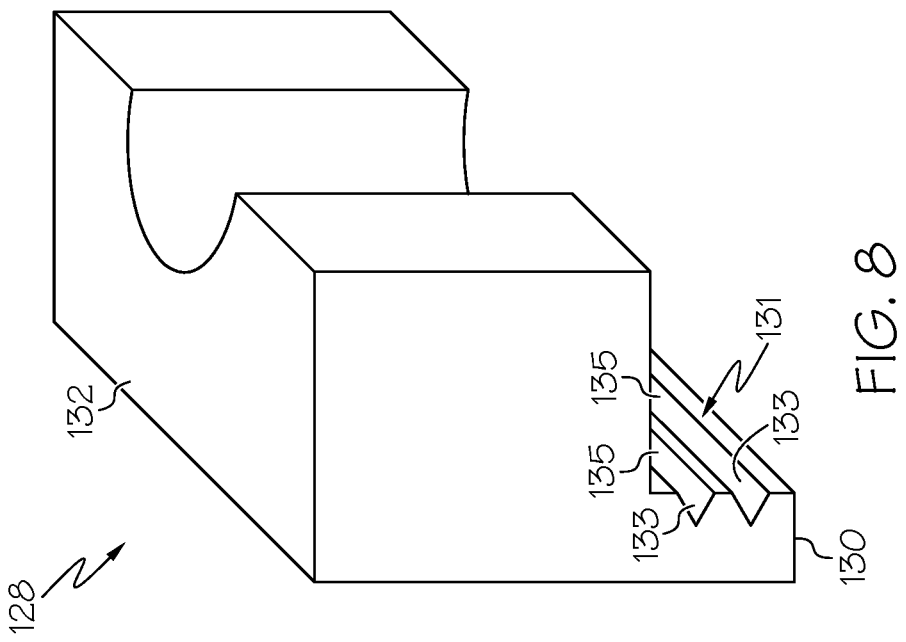
Figure 7:
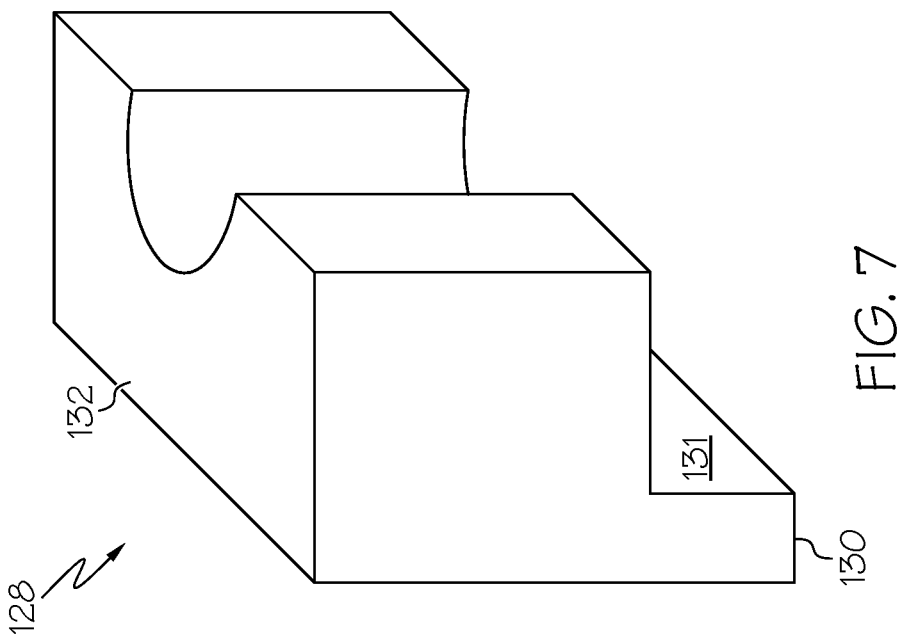
Figure 9:
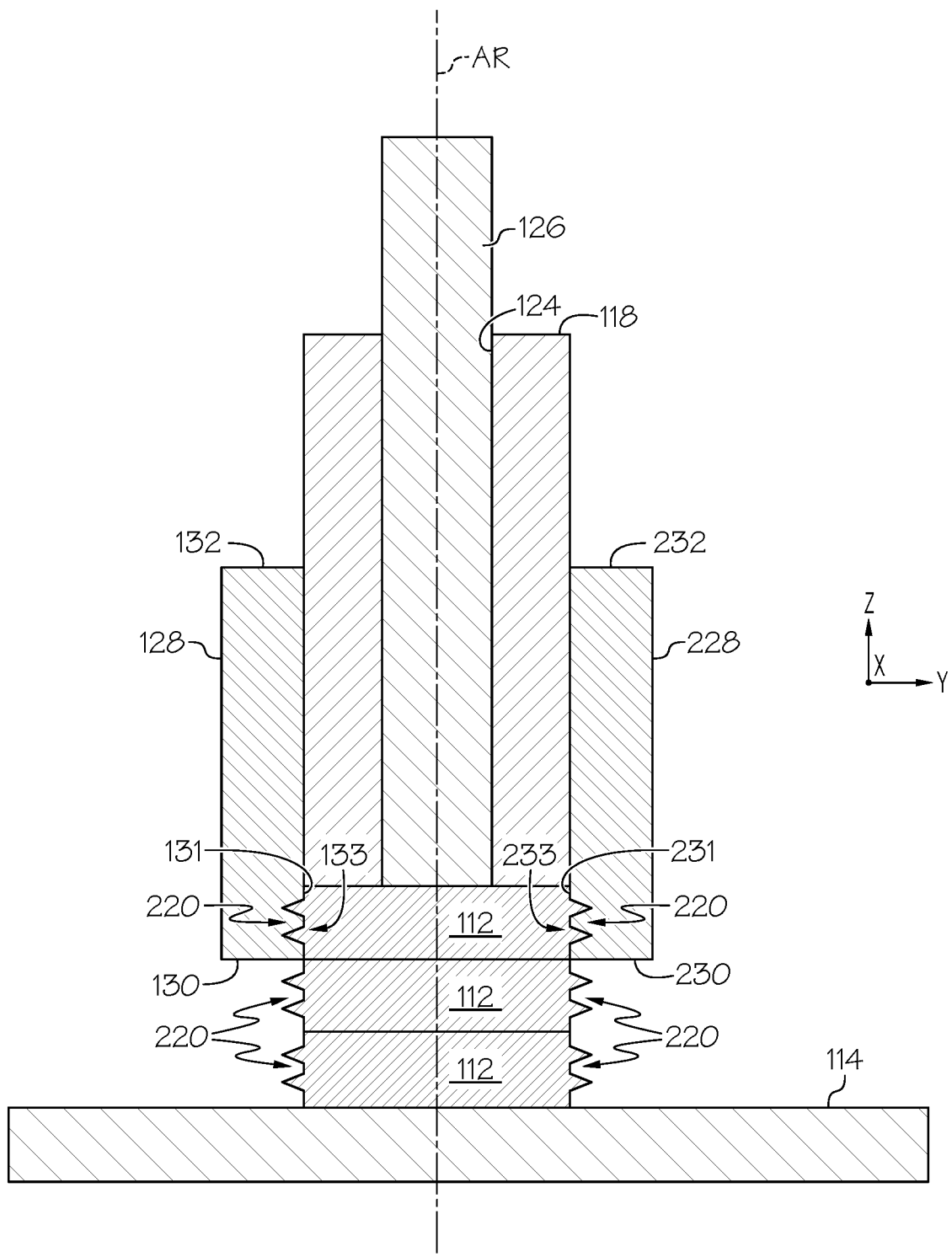
Figure 10:
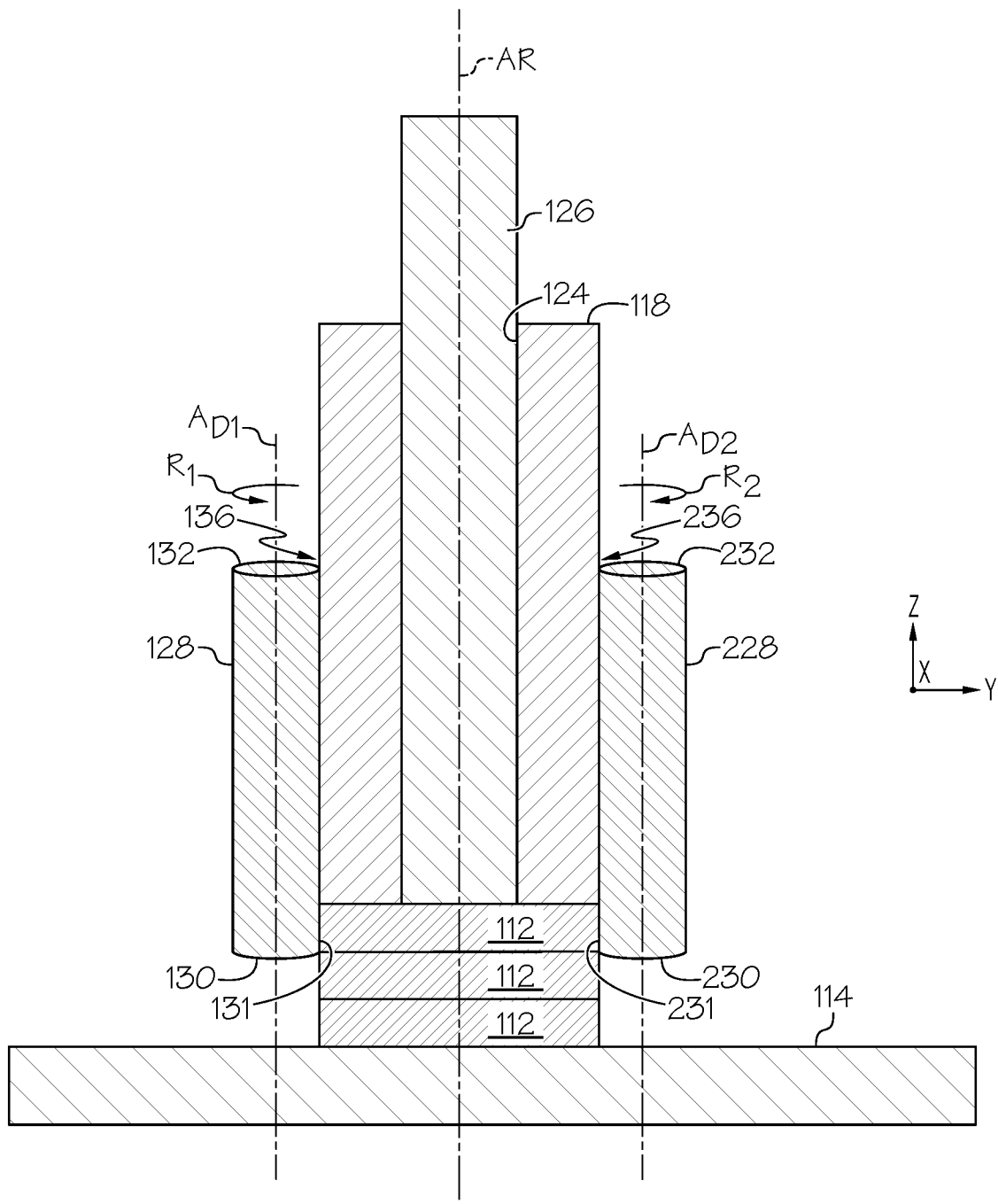
Figure 11:
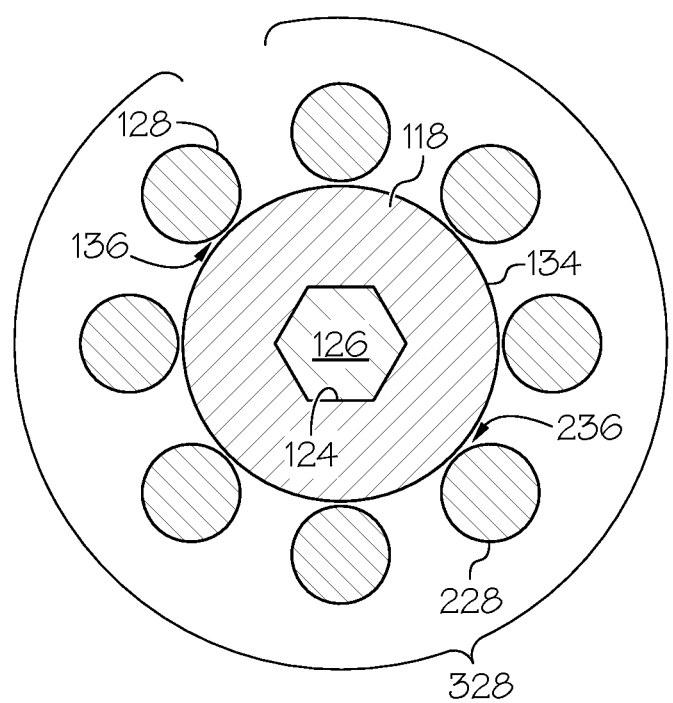
Figure 12:
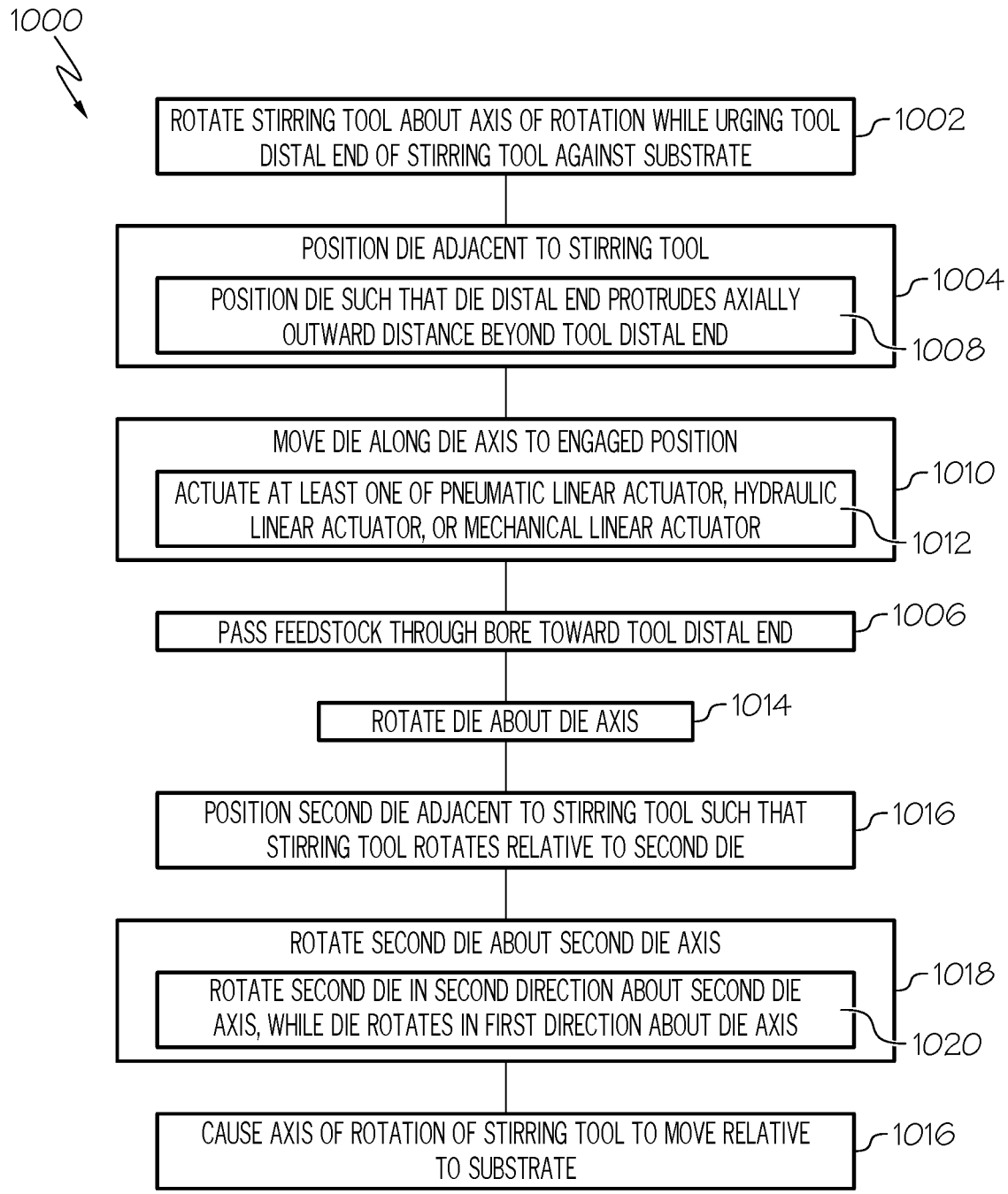
Figure 13:
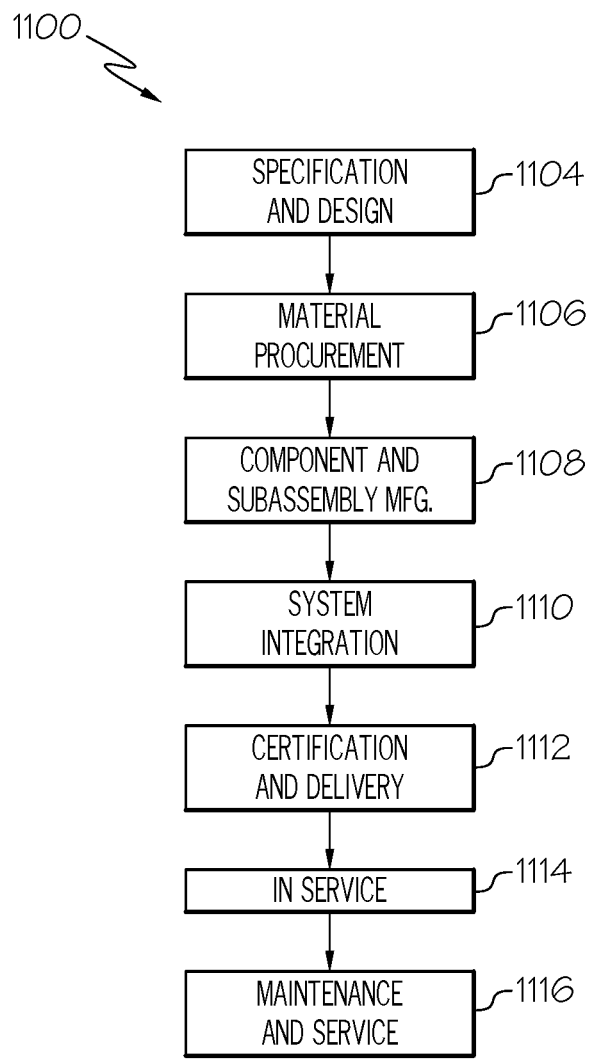

Having thus described one or more examples of the present disclosure in general terms, reference will now be made to the accompanying drawings, which are not necessarily drawn to scale, and wherein like reference characters designate the same or similar parts throughout the several views, and wherein:

FIG. 1, is a block diagram of an additive manufacturing system for depositing an extrude onto a substrate, according to one or more examples of the present disclosure;

FIG. 2 is a schematic, perspective view of a sub-assembly of the additive manufacturing system of FIG. 1, according to one or more examples of the present disclosure;

FIG. 3 is a schematic, perspective view of a sub-assembly of the additive manufacturing system of FIG. 1, according to one or more examples of the present disclosure;

FIG. 4 is a schematic, elevation, sectional view of a sub-assembly of the additive manufacturing system of FIG. 1, according to one or more examples of the present disclosure;

FIG. 5 is a schematic, elevation, sectional view of a sub-assembly of the additive manufacturing system of FIG. 1, according to one or more examples of the present disclosure;

FIG. 6 is a schematic, perspective view of a sub-assembly of the additive manufacturing system of FIG. 1, according to one or more examples of the present disclosure;

FIG. 7 is a schematic, perspective view of a die of the additive manufacturing system of FIG. 1, according to one or more examples of the present disclosure;

FIG. 8 is a schematic, perspective view of a die of the additive manufacturing system of FIG. 1, according to one or more examples of the present disclosure;

FIG. 9 is a schematic, elevation, sectional view of a sub-assembly of the additive manufacturing system of FIG. 1, according to one or more examples of the present disclosure;

FIG. 10 is a schematic, elevation, sectional view of a sub-assembly of the additive manufacturing system of FIG. 1, according to one or more examples of the present disclosure;

FIG. 11 is a schematic, plan view of a deposition head of the additive manufacturing system of FIG. 1, according to one or more examples of the present disclosure;

FIG. 12, is a block diagram of a method of depositing an extrude onto a substrate utilizing the additive manufacturing system of FIG. 1, according to one or more examples of the present disclosure;

FIG. 13 is a block diagram of aircraft production and service methodology; and

Figure 14:
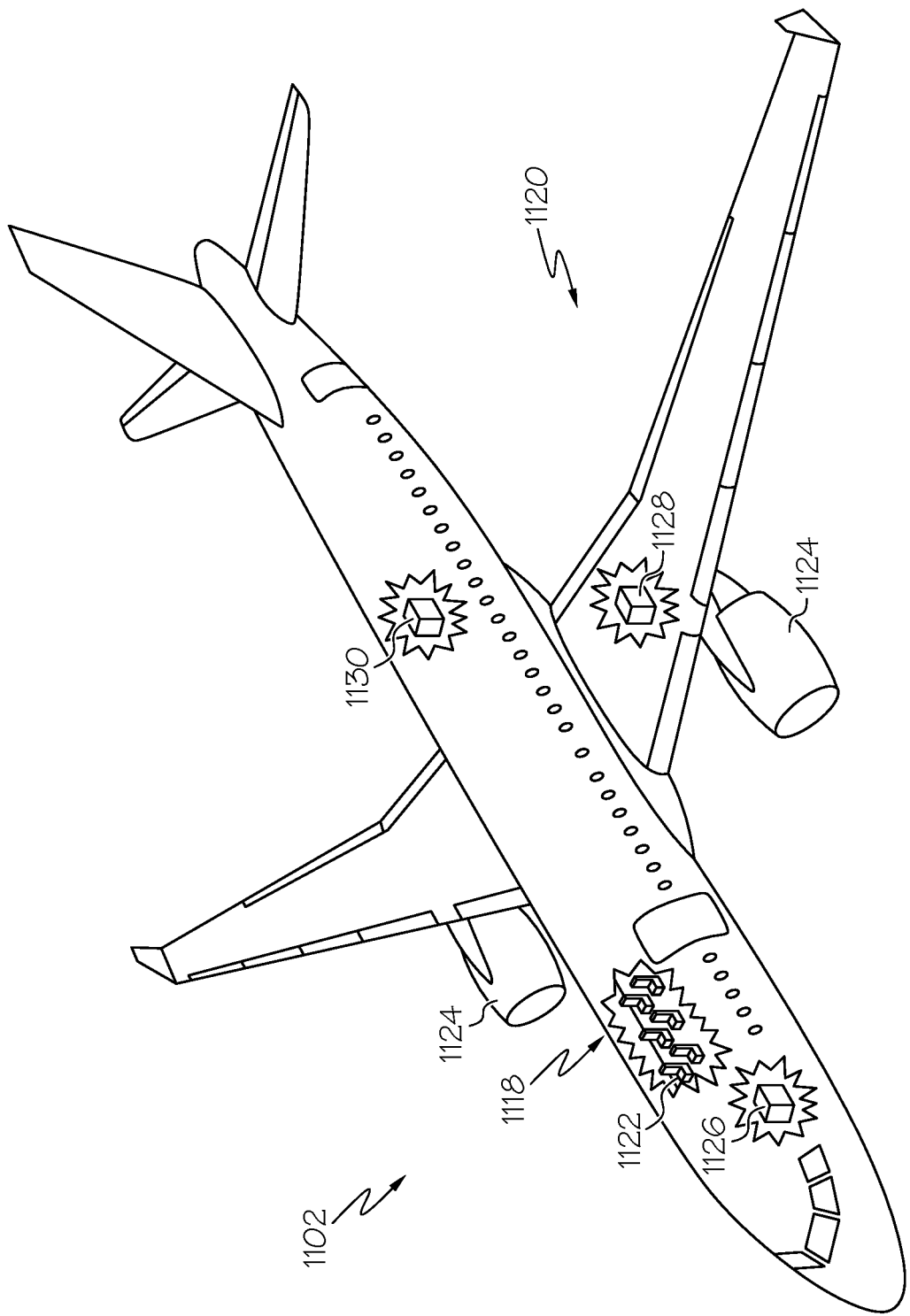

FIG. 14 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 12 and 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12 and 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-11, additive manufacturing system 110 for depositing extrudate 112 onto substrate 114 is disclosed. Additive manufacturing system 110 comprises deposition head 116. Deposition head 116 comprises stirring tool 118. Stirring tool 118 is rotatable about axis of rotation $A_R$. Stirring tool 118 comprises tool distal end 120 and tool proximal end 122, axially opposing tool distal end 120 along axis of rotation $A_R$. Stirring tool 118 defines bore 124. Bore 124 extends from tool proximal end 122 to tool distal end 120. Bore 124 is configured to receive feedstock 126. Feedstock 126 is biased toward tool distal end 120. Deposition head 116 also comprises die 128. Die 128 is positioned adjacent to stirring tool 118. Die 128 defines die axis $A_{D1}$. Die 128 comprises die distal end 130 and die proximal end 132, axially opposing die distal end 130 along die axis $A_{D1}$. Die axis $A_{D1}$ is parallel to axis of rotation $A_R$ of stirring tool 118. The preceding subject matter of this paragraph characterizes example 1 of the present disclosure.

Additive manufacturing system 110 provides a wide range of capabilities, including additive manufacturing, coating applications, component repair, metal joining, and custom metal alloy and metal matrix composite billet and part fabrication by depositing extrudate 112 onto substrate 114. Die 128 serves as a forming tool for controlling geometry and/or dimensions of extrudate 112 when deposited on substrate 114.

Additive manufacturing system 110 is a solid-state process; meaning feedstock 126 does not reach melting temperature during the deposition process. In the additive friction stir deposition process using additive manufacturing system 110, feedstock 126 is delivered through bore 124 of stirring tool 118. Stirring tool 118 rapidly rotates and generates heat through dynamic contact friction at a tool-material interface. Heat is generated by dynamic contact friction between stirring tool 118 and build material. For the purpose of the present disclosure, the term "build material" refers to at least one of feedstock 126, extrudate 112, substrate 114, or some combination thereof. Heat is dissipated by plastic deformation of the build material. Heat is transferred inside the build material by thermal conduction and thermal convection via material flow. Heated and softened, feedstock 126 is fed through stirring tool 126 as extrudate 112 and bonds with substrate 114 through plastic deformation at the interface.

As illustrated in FIGS. 2, 3, and 6, transverse motion of stirring tool 118, for example, in the direction of directional arrow 200, results in deposition of a single track, or a single layer, of extrudate 112. As best illustrated in FIGS. 4, 5, 9, and 10, a three-dimensional object is made by selectively adding subsequent layers of extrudate 112 upon preceding layers of extrudate 112 (e.g., three layers of extrudate 112 are depicted in FIGS. 4, 5, 9, and 10).

In one or more examples, tool distal end 120 of stirring tool 118 includes, or forms, a tool shoulder that is positioned in physical (e.g., direct) contact with a surface of substrate 114 (e.g., during deposition of an initial layer of extrudate 112) or a surface of a preceding layer of extrudate 112 (e.g., during deposition of a subsequent layer of extrudate 112). Bore 124 extends through the tool shoulder formed at tool distal end 120 of stirring tool 118 and feedstock 126 is biased toward tool distal end 120 and is positioned in physical (e.g., direct) contact with the surface of substrate 114 (e.g., during deposition of an initial layer of extrudate 112) or a surface of a preceding layer of extrudate 112 (e.g., during deposition of a subsequent layer of extrudate 112). Dynamic contact friction between the tool shoulder formed at tool distal end 120 of stirring tool 118 and the surface of substrate 114 or the surface of a preceding layer of extrudate 112 generate heat during rotation of stirring tool 118. Dynamic contact friction between a distal end of feedstock 126 and the surface of substrate 114 or the surface of a preceding layer of extrudate 112 generate heat during rotation of feedstock 126, which is co-rotated by rotation of stirring tool 118.

In one or more examples, surface quality of at least one layer of, or each layer of, extrudate 112 and, thus, surface quality of at least a portion of the three-dimensional object, or the three-dimensional object as a whole, is improved by use of die 128. As illustrated in FIGS. 2-5 and 8-10, in one or more examples, die 128 is located, or is positioned, adjacent to stirring tool 118 during deposition of extrudate 112. As used herein, the term "adjacent" means being near or in relatively close proximity. It should be appreciated that the location of die 128 relative to stirring tool 118 (e.g., the degree of proximity of die 128 relative to stirring tool 118) depends on various factors, including, but not limited to, the desired (e.g., lateral) dimension of the layer of extrudate 112 being deposited along any given run of deposition head 116 or the desired (e.g., lateral) dimensions of the three-dimensional object.

Further, for the purpose of the present disclosure, the term "parallel," such as in reference to die axis $A_{D1}$ of die 128 being parallel to axis of rotation $A_R$ of stirring tool 118, means that items are side by side and have the same distance continuously between them. As used herein, the term "parallel" includes a condition in which items are exactly parallel and a condition in which items are approximately parallel. As used herein, the term "approximately" refers to a condition that is close to, but not exactly, the stated condition that still performs the desired function or achieves the desired result, such as a condition that is within an acceptable predetermined tolerance or accuracy. For example, the term "approximately" refers to a condition that is within 10% of the stated condition. However, the term "approximately" does not exclude a condition that is exactly the stated condition.

In one or more examples, die axis $A_{D1}$ of die 128 and axis of rotation $A_R$ of stirring tool 118 are parallel to each other and reside in the same virtual plane. In one or more examples, die axis $A_{D1}$ of die 128 resides in a virtual die-plane and axis of rotation $A_R$ of stirring tool 118 resides in a virtual tool-plane, and the virtual die-plane and the virtual tool-plane are parallel to each other.

Generally, during the deposition process, a portion of plasticized build material (e.g., softened portions of a current layer of extrudate 112 being deposited and a previous layer of extrudate 112, on which the current layer of extrudate 112 is deposited, or substrate 114 on which the current layer of extrudate 112 is deposited) may flow radially outward from a deposition interface (e.g., the interface between stirring tool 118 and the build material). Die 128 is suitably located relative to stirring tool 118, or relative to the deposition interface between stirring tool 118 and the build material, so that die 128 controls a material flow of plasticized build material that radiates outward from the deposition interface. In other words, die 128 serves as a physical stop for a radial flow of plasticized build material.

In one or more examples, die 128 enables dimensional control of the three-dimensional object built during the deposition process using additive manufacturing system 110. Control of material flow using die 128 enables control of at least one dimension (e.g., a lateral dimension) of each layer of extrudate 112 being deposited. In other words, die 128 prevents extrudate 112 from extending beyond a desired dimension and inhibits a build-up of excess material along a periphery (e.g., an external boundary of a surface) of the layer of extrudate 112 being deposited.

Further, in one or more examples, die 128 enables control of a contour and/or control of surface characteristics of the periphery (e.g., side surface) of the layer of extrudate 112 being deposited. In one or more examples, die 128 provides for a planar or contoured side surface of the layer of extrudate 112 being deposited. In one or more examples, die 128 provides for a relatively smooth side surface of the layer of extrudate 112 being deposited.

As illustrated in FIG. 2, in one or more examples, die 128 is used when only one surface, or only one side, of the layer of extrudate 112 being deposited needs to be controlled. For example, die 128 controls the flow of plasticized material at one location to prevent extrudate 112 from extending beyond a predetermined limit at one side of the layer of extrudate 112 being deposited and control of surface characteristics of one side of the layer of extrudate 112 being deposited.

In one or more examples, die 128 and stirring tool 118 move together when depositing a layer of extrudate 112, for example, by transverse movement of deposition head 116. In one or more examples, die 128 and stirring tool 118 move independently. In such examples, die 128 moves into position, followed by transverse movement of stirring tool 118 to deposit the layer of extrudate 112.

Referring generally to FIG. 1 and particularly to, e.g., FIGS. 2, 3, and 5, stirring tool 118 is rotatable relative to die 128 about axis of rotation $A_R$. The preceding subject matter of this paragraph characterizes example 2 of the present disclosure, wherein example 2 also includes the subject matter according to example 1, above.

Rotation of stirring tool 118 about axis of rotation $A_R$ relative to die 128 enables independent rotational motion control of stirring tool 118 relative to die 128.

As illustrated in FIGS. 2, 3, and 5, in one or more examples, stirring tool 118 rotates about axis of rotation $A_R$ relative to die 128, for example, in the direction of directional arrow 202. Stirring tool 118 rotates in a clockwise direction or a counter clockwise direction, in one or more examples. Rapid rotation of stirring tool 118 generates heat through dynamic contact friction between stirring tool 118 and substrate 114 (e.g., during deposition of an initial layer of extrudate 112) or between stirring tool 118 and a preceding layer of extrudate 112 (e.g., during deposition of a subsequent layer of extrudate 112).

Referring generally to FIG. 1 and particularly to, e.g., FIGS. 2-6, 9, and 10, stirring tool 118 comprises outer surface 134. Shortest distance 136 between die 128 and outer surface 134 is at most 3 millimeters. The preceding subject matter of this paragraph characterizes example 3 of the present disclosure, wherein example 3 also includes the subject matter according to example 1 or 2, above.

Shortest distance 136 between die 128 and outer surface 134 of stirring tool 118, being at most 3 millimeters, limits a distance that plasticized build material can flow radially outward from the interface with stirring tool 118 during deposition of any layer of extrudate 112 and, thus, controls a dimension (e.g., a lateral dimension) of the layer of extrudate 112 being deposited.

In one or more examples, the term "3 millimeters" refers to approximately 3 millimeters.

Referring generally to FIG. 1 and particularly to, e.g., FIGS. 2-6, 9, and 10, stirring tool 118 comprises outer surface 134. Shortest distance 136 between die 128 and outer surface 134 is at most 1 millimeter. The preceding subject matter of this paragraph characterizes example 4 of the present disclosure, wherein example 4 also includes the subject matter according to example 1 or 2, above.

Shortest distance 136 between die 128 and outer surface 134 of stirring tool 118, being at most 1 millimeter, limits a distance that plasticized build material can flow radially outward from the interface with stirring tool 118 during deposition of any layer of extrudate 112 and, thus, controls a dimension (e.g., a lateral dimension) of the layer of extrudate 112 being deposited.

In one or more examples, the term "1 millimeter" refers to approximately 1 millimeter.

In one or more examples, shortest distance 136 between die 128 and outer surface 134 of stirring tool 118 is less than 1 millimeter. In one or more examples, shortest distance 136 between die 128 and outer surface 134 is close to zero. In one or more examples, shortest distance 136 between die 128 and outer surface 134 of stirring tool 118 is greater than 3 millimeters. It should be appreciated that shortest distance 136 between die 128 and outer surface 134 of stirring tool 118 depends on various factors, including, but not limited to, the desired (e.g., lateral) dimension of the layer of extrudate 112 being deposited along any given run of deposition head 116 or the desired (e.g., lateral) dimensions of the three-dimensional object.

Referring generally to FIG. 1 and particularly to, e.g., FIGS. 2-6 and 9-11, feedstock 126 is received in bore 124 such that rotation of stirring tool 118 causes corresponding rotation of feedstock 126. The preceding subject matter of this paragraph characterizes example 5 of the present disclosure, wherein example 5 also includes the subject matter according to any one of examples 1 to 4, above.

Rotation of stirring tool 118 also rotates (e.g., co-rotates) feedstock 126, located in bore 24 of stirring tool 118, about axis of rotation $A_R$ relative to die 128. Rapid rotation of feedstock 126 generates heat through dynamic contact friction between feedstock 126 and substrate 114 (e.g., during deposition of an initial layer of extrudate 112) or between feedstock 126 and a preceding layer of extrudate 112 (e.g., during deposition of a subsequent layer of extrudate 112).

As illustrated in FIG. 11, in one or more examples, feedstock 126 and bore 124 of stirring tool 118 have complementary cross-sectional geometries, viewed along axis of rotation $A_R$ of stirring tool 118 (FIGS. 2-6, 9, and 10). As such, a rotational orientation of feedstock 126 is fixed relative to stirring tool 118, feedstock 126 is inhibited from rotating relative to stirring tool 118, and feedstock 126 co-rotates with stirring tool 118. As illustrated in FIG. 11, in one or more examples, feedstock 126 and bore 124 of stirring tool 118 have complementary hexagonal cross-sections, viewed along axis of rotation $A_R$ of stirring tool 118. In one or more examples, feedstock 126 and bore 124 of stirring tool 118 have any one of various other complementary cross-sections, viewed along axis of rotation $A_R$ of stirring tool 118, such as triangular, square, octagonal, and the like.

In one or more examples, feedstock 126 is biased toward tool distal end 120 of stirring tool 118 and into contact with substrate 114 (e.g., during deposition of an initial layer of extrudate 112) or a preceding layer of extrudate 112 (e.g., during deposition of a subsequent layer of extrudate 112) by a feed-stock force sufficient to inhibit rotation of feedstock 126 relative to stirring tool 118.

Referring generally to FIG. 1, feedstock 126 comprises metal or metal alloy. The preceding subject matter of this paragraph characterizes example 6 of the present disclosure, wherein example 6 also includes the subject matter according to any one of examples 1 to 5, above.

Feedstock 126 being metal or metal alloy enables additive manufacturing system 110 to fabricate a three-dimensional object, formed of any one of various custom metals or metal alloys by depositing extrudate 112 onto substrate 114.

In one or more example, metal includes any one or more of a wide range of metals, such as, but not limited to, steel, aluminum, nickel, copper, magnesium, titanium, iron, and the like. In one or more examples, metal alloy includes any one or more of a wide range of metal alloys formed of iron, carbon, steel, manganese, nickel, chromium, molybdenum, boron, titanium, vanadium, tungsten, cobalt, niobium, and the like or combinations thereof.

In one or more examples, every layer of extrudate 112 deposited on substrate 114 is formed of the same feedstock material (e.g., the same metal or metal alloy). In such examples, a three-dimensional object, formed by the deposition process using additive manufacturing system 110, is isotropic. In one or more examples, at least one layer of extrudate 112 deposited on substrate 114 is formed of a different feedstock material than at least one other layer of extrudate 112, deposited on substrate 114. In such examples, a three-dimensional object, formed by the deposition process using additive manufacturing system 110, is anisotropic.

In one or more examples, feedstock 126 is a solid material, such as a solid rod of metal or a solid rod of metal alloy.

In one or more examples, feedstock 126 is a powdered material, such powdered metal or powdered metal alloy.

Referring generally to FIG. 1 and particularly to, e.g., FIG. 4, die distal end 130 axially protrudes distance D beyond tool distal end 120. The preceding subject matter of this paragraph characterizes example 7 of the present disclosure, wherein example 7 also includes the subject matter according to any one of examples 1 to 6, above.

Die distal end 130 of die 128 protruding axially, for example, along die axis $A_{D1}$ of die 128, distance D beyond tool distal end 120 locates a portion of die 128 in position to at least one of form a portion of the layer of extrudate 112 being deposited, control a dimension of a portion of the layer of extrudate 112 being deposited, and/or control a surface characteristic of a portion of the layer of extrudate 112 being deposited.

In one or more examples, distance D is equal to or greater than a thickness dimension of the layer of extrudate 112 being deposited. In such examples, a portion of die 128 is suitably positioned to control radial material flow from the deposition interface between stirring tool 118 and build material and to form a side surface of the layer of extrudate 112 being deposited.

Referring generally to FIG. 1, die 128 is formed of a first metallic material, having a first composition. Stirring tool 118 is formed of a second metallic material, having a second composition. The first composition and the second composition are equivalent to each other. The preceding subject matter of this paragraph characterizes example 8 of the present disclosure, wherein example 8 also includes the subject matter according to any one of examples 1 to 7, above.

The first composition of the first metallic material of die 128 and the second composition of the second metallic material of stirring tool 118 being equivalent to each other provides for die 128 and stirring tool 118 having equivalent material properties and/or thermal properties.

For the purpose of the present disclosure, the term "equivalent" refers to a condition that is exactly identical to the stated condition or a condition that is substantially the same as the stated condition. As used herein, the term "substantially" refers to a condition that is similar to an extent that it may be perceived as being exact. Thus, the phrase "A is equivalent to B" encompasses conditions in which A is exactly the same as B, or where A is within a predetermined allowable variance of (e.g., +/−5%) of B, or vice versa.

In one or more examples, the first composition of the first metallic material of die 128 and the second composition of the second metallic material of stirring tool 118 being equivalent to each other provide for die 128 and stirring tool 118 having equivalent hardness and thermal conductivity properties. As such, additive manufacturing system 110 is capable of sufficiently heating the interface between stirring tool 118 and substrate 114 (e.g., during deposition of an initial layer of extrudate 112) or the interface between stirring tool 118 and a preceding layer of extrudate 112 (e.g., during deposition of a subsequent layer of extrudate 112), heating the interface between feedstock 126 and substrate 114 or the interface between feedstock 126 and a preceding layer of extrudate 112, and/or heating the interface between stirring tool 118 and feedstock 126 for deposition of extrudate 112 (e.g., formation of a layer of extrudate 112) without die 128 having a material impact on the generation, transfer, or dissipation of heat during the deposition process.

In one or more examples, the first composition of the first metallic material of die 128 and the second composition of the second metallic material of stirring tool 118 is any one of various material compositions suitable for additive friction stir deposition. In one or more examples, the second composition of the second metallic material selected for stirring tool 118 is harder than the material composition of feedstock 126 so that stirring tool 118 is not consumed during the friction stir deposition process. In other words, stirring tool 118 is a non-consumable tool.

Similarly, in one or more examples, the first composition of the first metallic material selected for die 128 is harder than the material composition of feedstock 126 so that die 128 is not consumed during the friction stir deposition process. In other words, die 128 is a non-consumable tool.

In one or more examples, the first composition of the first metallic material of die 128 and the second composition of the second metallic material of stirring tool 118 are different. In such examples, the first composition of the first metallic material of die 128 is selected for a particular thermal effect on the generation, transfer, or dissipation of heat during the deposition process. In one or more examples, the first composition of the first metallic material of die 128 is selected to function as a heat sink, configured to selectively control the rate of cooling of the layer of extrudate 112.

Referring generally to FIG. 1 and particularly to, e.g., FIGS. 4, 5, 9, and 10, die 128 is movable relative to stirring tool 118 along die axis $A_{D1}$ between, inclusively, at least a retracted position and an engaged position. Die distal end 130 protrudes axially outward distance D beyond tool distal end 120 when die 128 is in the engaged position. The preceding subject matter of this paragraph characterizes example 9 of the present disclosure, wherein example 9 also includes the subject matter according to any one of examples 1 to 8, above.

Movement of die 128 relative to stirring tool 118 between the retracted position and the engaged position enables selective control of a flow-inhibiting function of die 128 and/or surface-forming function of die 128, when rotationally moving stirring tool 118 or moving deposition head 116 during deposition of extrudate 112.

For illustrative purposes, FIGS. 4, 9, and 10 depict die 128 in the engaged position and FIG. 5 depicts die 128 in the retracted position. In one or more examples, die 128 moves along die axis $A_{D1}$ from the retracted position to the engaged position so that die distal end 130 of die 128 protrudes distance D beyond tool distal end 120 of stirring tool 118, as depicted in FIG. 4. When in the engaged position, die 128 is suitably located to engage a periphery (e.g., a side surface) of the layer of extrudate 112 being deposited for performance of its flow-inhibiting function and/or its surface-forming function. In one or more examples, die 128 moves along die axis $A_{D1}$ from the engaged position to the retracted position so that die distal end 130 of die 128 is approximately aligned with tool distal end 120 of stirring tool 118, as depicted in FIG. 4. When in the retracted position, die 128 is suitably located not to engage a periphery (e.g., a side surface) of the layer of extrudate 112 being deposited.

Although the illustrative examples of the three-dimensional object, formed from layers of extrudate 112 deposited on substrate 114, depict a substantially linear, in plan view, three-dimensional object, which is formed from substantially linear, in plan view, layers of extrudate 112, in other examples, the three-dimensional object or one or more layers of extrudate 112 has a non-linear or complex shape, in plan view. It should be appreciated that in one or more examples, the movement path of deposition head 116 for deposition of any given layer of extrudate 112 depends on various factors, such as the geometry of a portion of the three-dimensional object formed by the respective layers of extrudate 112.

As illustrated in FIGS. 2-6, 9, and 10, in one or more examples, each layer of extrudate 112 is deposited by moving deposition head 116 along an approximately linear movement path and, thus, forming a linear layer of extrudate 112. In such examples, die 128 is positioned in the engaged position along any portion of, or an entirety of, the run of deposition head 116 when depositing the linear layer of extrudate 112.

In one or more examples, one or more layers of extrudate 112 are deposited by moving deposition head 116 along a non-linear movement path and, thus, forming a non-linear layer of extrudate 112. In such examples, die 128 is positioned in the engaged position along any portion of, or an entirety of, the run of deposition head 116 when depositing the non-linear layer of extrudate 112. In one or more examples, die 128 is positioned in the engaged position along one portion of the run of deposition head 116, when depositing one portion of the layer of extrudate 112, and is positioned in the retracted position along another portion of the run of depositions head 116, when depositing another portion of the layer of extrudate 112, such as at corners or bends of the layer of extrudate 112 or at turns or deposition head 116.

Referring generally to FIG. 1, additive manufacturing system 110 further comprises die force applicator 140, operatively connected to die 128 to selectively move die 128 along die axis $A_{D1}$ between at least the retracted position and the engaged position. The preceding subject matter of this paragraph characterizes example 10 of the present disclosure, wherein example 10 also includes the subject matter according to example 9, above.

Die force applicator 140 enables selective control of a position of die 128 along die axis $A_{D1}$ relative to stirring tool 118, between the retracted position and the engaged position.

Die force applicator 140 may be any one of various types of force application devices, linear motion control devices, or actuators suitable to selectively apply a die force to die 128 and selectively position die 128 along die axis $A_{D1}$. In one or more examples, die force applicator 140 is a linear actuator. In one or more examples, die force applicator 140 is a two-position actuator, configured to position die 128 in the retracted position and the engaged position. In one or more examples, die force applicator 140 is a multi-position actuator, configured to position die 128 in the retracted position, the engaged position, and one or more positions between the retracted position and the engaged position.

In one or more examples, additive manufacturing system 110 includes a control unit communicatively coupled with die force applicator 140. The control unit is configured to provide operating instructions to die force applicator 140 for selective positioning of die 128 during deposition of extrudate 112. In an example, control unit includes a processor and memory and the operating instructions take the form of computer readable program code, stored on the memory and executed by the processor.

Referring generally to FIG. 1, die force applicator 140 comprises at least one of a pneumatic linear actuator, a hydraulic linear actuator, or a mechanical linear actuator. The preceding subject matter of this paragraph characterizes example 11 of the present disclosure, wherein example 11 also includes the subject matter according to example 10, above.

Use of at least one of the pneumatic linear actuator, the hydraulic linear actuator, or the mechanical linear actuator as die force applicator 140 provides a simple, effective, and repeatable means of selectively positioning die 128 along die axis $A_{D1}$ relative to stirring tool 118, between at least the retracted position and the engaged position.

Referring generally to FIG. 1 and particularly to, e.g., FIG. 11, die 128 is one of plurality of dies 328, positioned adjacent to stirring tool 118. The preceding subject matter of this paragraph characterizes example 12 of the present disclosure, wherein example 12 also includes the subject matter according to any one of examples 1 to 11, above.

Plurality of dies 328 serve as forming tool for controlling the geometry and/or the dimension at a plurality of sides, or of a plurality of surfaces, of extrudate 112 when deposited on substrate 114.

In one or more examples, plurality of dies 328 enables dimensional control of the three-dimensional object built during the deposition process using additive manufacturing system 110. Control of material flow using plurality of dies 328 enables control of at least one dimension (e.g., a lateral dimension) of each layer of extrudate 112 being deposited. In other words, plurality of dies 328 prevents extrudate 112 from extending beyond a desired dimension and inhibits a build-up of excess material along a periphery (e.g., an external boundary of a surface) of the layer of extrudate 112 being deposited.

Further, in one or more examples, plurality of dies 328 enables control of a contour and/or control of surface characteristics of the periphery (e.g., a plurality of side surfaces) of the layer of extrudate 112 being deposited. In one or more examples, plurality of dies 328 provides for planar or contoured side surfaces of the layer of extrudate 112 being deposited. In one or more examples, plurality of dies 328 provides for relatively smooth side surfaces of the layer of extrudate 112 being deposited.

In one or more examples, plurality of dies 328 and stirring tool 118 move together when depositing a layer of extrudate 112, for example, by transverse movement of deposition head 116. In one or more examples, plurality of dies 328 and stirring tool 118 move independently. In such examples, at least one of plurality of dies 328 moves into position, followed by transverse movement of stirring tool 118 to deposit the layer of extrudate 112.

In one or more examples, die force applicator 140 is operatively connected to each one of plurality of dies 328 to selectively move each one of plurality of dies 328 along a respective die axis between at least the retracted position and the engaged position.

As illustrated in FIG. 11, in one or more examples, deposition head 116 includes any number of dies, such as die 128, second die 228, third die, fourth die, etc. As used herein, the term "number of" items means one or more items. In one or more examples, each one of plurality of dies 328 is positioned adjacent to stirring tool 118 and has a respective die axis that is parallel to the axis of rotation $A_R$ of stirring tool 118. In one or more examples, each one of plurality of dies 328 is independently movable along its respective die axis during deposition of a layer of extrudate 112.

Referring generally to FIG. 1, additive manufacturing system 110 further comprises stirring-tool force applicator 144, configured to urge deposition head 116 against substrate 114. The preceding subject matter of this paragraph characterizes example 13 of the present disclosure, wherein example 13 also includes the subject matter according to any one of examples 1 to 12, above.

Stirring-tool force applicator 144 enables selective control of a position of stirring tool 118 relative to substrate 114 or relative to a preceding layer of extrudate 112 during deposition of extrudate 112.

Stirring-tool force applicator 144 may be any one of various types of force application devices, linear motion control devices, or actuators suitable to selectively apply a stirring-tool force to stirring tool 118 and selectively position stirring tool 118 relative to substrate 114 or relative to a preceding layer of extrudate 112, such as along axis of rotation $A_R$. In one or more examples, stirring-tool force applicator 144 is operatively coupled with stirring tool 118. Stirring-tool force applicator 144 is configured to urge stirring tool 118 against substrate 114, or preceding layer of extrudate 112, such that the tool shoulder of tool proximal end 122 is in direct, physical contact with the surface of substrate 114, or the surface of the preceding layer of extrudate 112, with a force sufficient to generate heat through dynamic contact friction when stirring tool 118 rotates.

In one or more examples, stirring-tool force applicator 144 is a linear actuator. In one or more examples, stirring-tool force applicator 144 includes at least one of a pneumatic linear actuator, a hydraulic linear actuator, or a mechanical linear actuator. Use of at least one of the pneumatic linear actuator, the hydraulic linear actuator, or the mechanical linear actuator as stirring-tool force applicator 144 provides a simple, effective, and repeatable means of selectively positioning stirring tool 118 relative to substrate 114.

In one or more examples, the control unit is communicatively coupled with stirring-tool force applicator 144. The control unit is configured to provide operating instructions to stirring-tool force applicator 144 for selective positioning of stirring tool 118 during deposition of extrudate 112.

Referring generally to FIG. 1, additive manufacturing system 110 further comprises stirring-tool rotation device 146, configured to rotate stirring tool 118 about axis of rotation $A_R$ while stirring-tool force applicator 144 urges deposition head 116 against substrate 114. The preceding subject matter of this paragraph characterizes example 14 of the present disclosure, wherein example 14 also includes the subject matter according to example 13, above.

Stirring-tool rotation device 146 enables rapid rotation of stirring tool 118 about axis of rotation $A_R$ during deposition of extrudate 112.

Stirring-tool rotation device 146 may be any one of various types of rotational force application devices, rotational motion control devices, or actuators suitable to rotate stirring tool 118 about axis of rotation $A_R$. In one or more examples, stirring-tool rotation device 146 is operatively coupled with stirring tool 118. With the tool shoulder of tool proximal end 122 of stirring tool 118 in contact with the surface of substrate 114 (e.g., during deposition of an initial layer of extrudate 112) or the surface of preceding layer of extrudate 112 (e.g., during deposition of a subsequent layer of extrudate 112), stirring-tool rotation device 146 is configured to rotate stirring tool 118 at a rotational speed, sufficient to generate heat through dynamic contact friction at the deposition interface.

In one or more examples, stirring-tool rotation device 146 is a rotary actuator. In one or more examples, stirring-tool rotation device 146 includes at least one of a pneumatic rotary actuator, a hydraulic rotary actuator, or a mechanical rotary actuator. Use of at least one of the pneumatic rotary actuator, the hydraulic rotary actuator, or the mechanical rotary actuator as stirring-tool rotation device 146 provides a simple, effective, and repeatable means of rapidly rotating stirring tool.

In one or more examples, the control unit is communicatively coupled with stirring-tool rotation device 146. The control unit is configured to provide operating instructions to stirring-tool rotation device 146 for rotation of stirring tool 118 during deposition of extrudate 112.

Referring generally to FIG. 1, additive manufacturing system 110 further comprises feed-stock force applicator 148 that biases feedstock 126 toward tool distal end 120. The preceding subject matter of this paragraph characterizes example 15 of the present disclosure, wherein example 15 also includes the subject matter according to any one of examples 1 to 14, above.

Feed-stock force applicator 148 urges feedstock 126 into contact with substrate 114 or a preceding layer of extrudate 112 during deposition of extrudate 112.

Feed-stock force applicator 148 may be any one of various types of force application devices, linear motion control devices, or actuators suitable to selectively apply the feed-stock force to feedstock 126 and position feedstock 126 into contact with substrate 114 or a preceding layer of extrudate 112, such as along axis of rotation $A_R$. In one or more examples, feed-stock force applicator 148 is operatively coupled with feedstock 126. Feed-stock force applicator 148 is configured to urge feedstock 126 against substrate 114, or preceding layer of extrudate 112, such that the distal end of feedstock 126, positioned at, or protruding from, tool distal end 120 of stirring tool 118 is in direct, physical contact with the surface of substrate 114 or the surface of the preceding layer of extrudate 112 with a force, sufficient to generate heat through dynamic contact friction when feedstock 126 rotates (e.g., when feedstock 126 co-rotates with stirring tool 118).

In one or more examples, feed-stock force applicator 148 is a linear actuator. In one or more examples, feed-stock force applicator 148 includes at least one of a pneumatic linear actuator, a hydraulic linear actuator, or a mechanical linear actuator. Use of at least one of the pneumatic linear actuator, the hydraulic linear actuator, or the mechanical linear actuator as feed-stock force applicator 148 provides a simple, effective, and repeatable means of selectively urging feedstock 126 into contact with substrate 114 or a preceding layer of extrudate 112.

In one or more examples, the control unit is communicatively coupled with feed-stock force applicator 148. The control unit is configured to provide operating instructions to feed-stock force applicator 148 for urging feedstock 126 toward tool distal end 120 of stirring tool 118 (e.g., outward from bore 124) during deposition of extrudate 112.

Referring generally to FIG. 1, additive manufacturing system 110 further comprises carriage 150, connected to deposition head 116. Carriage 150 moves deposition head 116 relative to substrate 114. The preceding subject matter of this paragraph characterizes example 16 of the present disclosure, wherein example 16 also includes the subject matter according to any one of examples 1 to 15, above.

Carriage 150 enables deposition head 116 to move relative to substrate 114 or preceding layer of extrudate 112 during deposition of a subsequent layer of extrudate 112 independent of substrate 114.

Carriage 150 may be any one or various types of motion control devices or tool manipulators. In one or more examples, carriage 150 is a programmable robotic manipulator, such as a robotic arm, configured to automatically move deposition head 116 in three-dimensional space. In such examples, deposition head 116 takes the form of an end effector, connected to a working end of the robotic arm.

In one or more examples, the control unit is communicatively coupled with carriage 150. The control unit is configured to provide operating instructions to carriage 150 for selective positioning and moving of deposition head 116 during deposition of extrudate 112.

In one or more examples, additionally or alternatively, additive manufacturing system 110 also includes second carriage 250, connected to substrate 114. Second carriage 250 moves substrate 114 relative to deposition head 116. Second carriage 250 enables substrate 114 to move relative to deposition head 116 during deposition of a subsequent layer of extrudate 112 independent of deposition head 116. Second carriage 250 may be any one or various types of motion control devices or tool manipulators. In one or more examples, second carriage 250 is a programmable robotic manipulator, such as a robotic arm configured to automatically move substrate 114 in three-dimensional space. In one or more examples, the control unit is communicatively coupled with second carriage 250. The control unit is configured to provide operating instructions to second carriage 250 for selective positioning and moving of deposition head 116 during deposition of extrudate 112.

Referring generally to FIG. 1 and particularly to, e.g., FIGS. 4, 5, and 7-10, die 128 comprises engagement surface 131 that defines at least one shaping feature 133. The preceding subject matter of this paragraph characterizes example 17 of the present disclosure, wherein example 17 also includes the subject matter according to any one of examples 1 to 16, above.

Engagement surface 131 enables the flow-inhibiting function of die 128 and at least one shaping feature 133 enables the surface-forming function of die 128.

In one or more examples, engagement surface 131 provides a physical stop that limits a distance that plasticized build material can flow radially outward from the deposition interface of stirring tool 118 during deposition of any layer of extrudate 112. Limiting the radial flow of plasticized build material controls a dimension (e.g., a lateral dimension) and defines a side surface of the layer of extrudate 112 being deposited. As illustrated in FIG. 4, in one or more examples, engagement surface 131 of die 128 is formed by a portion of die distal end 130 of die 128 that protrudes distance D beyond tool distal end 120 of stirring tool 118.

In one or more examples, at least one shaping feature 133 provides a forming feature that controls a shape or characteristic of a side surface of the layer of extrudate 112 being deposited. As illustrated in FIGS. 7 and 8, in one or more examples, at least one shaping feature 133 is located on, or is formed by, engagement surface 131.

Referring generally to FIG. 1 and particularly to, e.g., FIGS. 4, 5, and 7, engagement surface 131 of die 128 is substantially planar. The preceding subject matter of this paragraph characterizes example 18 of the present disclosure, wherein example 18 also includes the subject matter according to example 17, above.

Engagement surface 131 of die 128 being substantially planar enables formation of a correspondingly substantially planar portion of a layer of extrudate 112 being deposited.

In one or more examples, engagement surface 131 of die 128 being substantially planar provides for a planar side surface of the layer of extrudate 112 being deposited. In one or more examples, engagement surface 131 of die 128 being substantially planar provides for a relatively smooth, flat side surface of the layer of extrudate 112 being deposited.

In one or more examples, engagement surface 131 of die 128 is contoured or includes a contour. Engagement surface 131 of die 128 being contoured enables formation of a correspondingly contoured portion of a layer of extrudate 112 being deposited. In one or more examples, engagement surface 131 of die 128 being contoured provides for a contoured side surface of the layer of extrudate 112 being deposited. In one or more examples, engagement surface 131 of die 128 being contoured provides for a relatively smooth, contoured side surface of the layer of extrudate 112 being deposited.

Referring generally to FIG. 1 and particularly to, e.g., FIGS. 8 and 9, at least one shaping feature 133 comprises groove 135. The preceding subject matter of this paragraph characterizes example 19 of the present disclosure, wherein example 19 also includes the subject matter according to example 17 or 18, above.

At least one shaping feature 133 comprising groove 135 enables formation of at least one surface feature 220 (FIG. 9) during deposition of a layer of extrudate 112.

In one or more examples, groove 135 provides for formation of a corresponding, complementary ridge, e.g., surface feature 220, (FIG. 9) located on, or protruding from, a side surface of the layer of extrudate 112 being deposited. As illustrated in FIGS. 8 and 9, in one or more examples, at least one shaping feature 133 includes a plurality of grooves that provide for formation of a corresponding plurality of ridges and grooves (e.g., at least one surface feature 220) on the side surface of the layer of extrudate 112 being deposited.

In one or more other examples, at least one shaping feature 133 includes any one of various other geometric shaping features configured to form at least one surface feature 220, complementary thereto, on the layer of extrudate 112 being deposited having any one of various geometries.

Referring generally to FIG. 1 and particularly to, e.g., FIG. 10, die 128 is rotatable about die axis $A_{D1}$. The preceding subject matter of this paragraph characterizes example 20 of the present disclosure, wherein example 20 also includes the subject matter according to any one of examples 1 to 17, above.

Rotational movement of die 128 about die axis $A_{D1}$ enables die 128 to assist in formation of any layer of extrudate 112 during deposition.

In one or more examples, during the additive friction stir deposition process using additive manufacturing system 110, die 128 rapidly rotates to generate heat through dynamic contact friction between die 128 (e.g., engagement surface 131 of die 128) and a portion of the layer of extrudate 112 being deposited. In one or more examples, generation of heat proximate to the periphery of the layer of extrudate 112 being deposited improves the quality of the three-dimensional object built using additive manufacturing system 110.

In one or more examples, during the additive friction stir deposition process using additive manufacturing system 110, die 128 rotates to smooth or otherwise shape at least a portion of the periphery (e.g., side surface) of the layer of extrudate 112 being deposited.

In one or more examples, die 128 has an approximately cylindrical shape, or an approximately circular shape in cross-section, viewed along die axis $A_{D1}$.

Referring generally to FIG. 1, additive manufacturing system 110 further comprises die-rotation device 142, operatively connected to die 128 to rotate die 128 about die axis $A_{D1}$. The preceding subject matter of this paragraph characterizes example 21 of the present disclosure, wherein example 21 also includes the subject matter according to example 20, above.

Die-rotation device 142 enables rotation of die 128 about die axis $A_{D1}$ during deposition of extrudate 112.

Die-rotation device 142 may be any one of various types of rotational force application devices, rotational motion control devices, or actuators suitable to rotate die 128 about die axis $A_{D1}$. In one or more examples, die-rotation device 142 is operatively coupled with die 128. With engagement surface 131 of die 128 in contact with the surface of a layer of extrudate being deposited, die-rotation device 142 is configured to rotate die 128. In one or more examples, die-rotation device 142 is configured to rotate die 128 at a rotational speed, sufficient to generate heat through dynamic contact friction. In one or more examples, die-rotation device 142 is configured to rotate die 128 at a rotational speed, sufficient to smooth or otherwise form a side surface of the layer of extrudate 112 being deposited.

Referring generally to FIG. 1 and particularly to, e.g., FIGS. 3-6 and 9-11, additive manufacturing system 110 further comprises second die 228. Second die 228 is positioned adjacent to stirring tool 118, defines second-die axis $A_{D2}$, and comprises second-die distal end 230 and second-die proximal end 232, axially opposing second-die distal end 230 along second-die axis $A_{D2}$. Second-die axis $A_{D2}$ is parallel with axis of rotation $A_R$ of stirring tool 118. The preceding subject matter of this paragraph characterizes example 22 of the present disclosure, wherein example 22 also includes the subject matter according to example 20 or 21, above.

Second die 228 serves as a forming tool for controlling geometry and/or dimensions of a second side, or second surface, of extrudate 112 when deposited on substrate 114.

In one or more example, second die 228 is one of plurality of dies 328 (FIG. 10).

In one or more examples, surface quality of at least one layer of, or each layer of, extrudate 112 and, thus, surface quality of at least a portion of the three-dimensional object, or the three-dimensional object as a whole, is improved by use of second die 228. As illustrated in FIGS. 3-6 and 9-11, in one or more examples, second die 228 is located, or is positioned, adjacent to stirring tool 118 during deposition of extrudate 112, such as laterally opposite to die 128. It should be appreciated that the location of second die 228 relative to stirring tool 118 (e.g., the degree of proximity of second die 228 relative to stirring tool 118) depends on various factors, including, but not limited to, the desired (e.g., lateral) dimension of the layer of extrudate 112 being deposited along any given run of deposition head 116 or the desired (e.g., lateral) dimensions of the three-dimensional object.

In one or more examples, second-die axis $A_{D2}$ of second die 228 and axis of rotation $A_R$ of stirring tool 118 are parallel to each other and reside in the same virtual plane. In one or more examples, second-die axis $A_{D2}$ of second die 228 and die axis $A_{D1}$ of die 128 are parallel to each other and reside in the same virtual plane. In one or more examples, second-die axis $A_{D2}$ of second die 228 resides in a virtual second die-plane and axis of rotation $A_R$ of stirring tool 118 resides in a virtual tool-plane, and the virtual die-plane and the virtual tool-plane are parallel to each other. In one or more examples, second-die axis $A_{D2}$ of second die 228 resides in a virtual second die-plane and die axis $A_{D1}$ of die 128 resides in a virtual die-plane, and the virtual second die-plane and the virtual die-plane are parallel to each other.

Generally, during the deposition process, a portion of plasticized build material (e.g., softened portions of a current layer of extrudate 112 being deposited and a previous layer of extrudate 112 on which the current layer of extrudate 112 is deposited or substrate 114 on which the current layer of extrudate 112 is deposited) flows radially outward from a deposition interface (e.g., the interface between stirring tool 118 and the build material). Second die 228 is suitably located relative to stirring tool 118, or relative to the deposition interface between stirring tool 118 and the build material, so that second die 228 controls a material flow of plasticized build material that radiates outward from the deposition interface. In other words, second die 228 serves as a physical stop for a radial flow of plasticized build material.

In one or more examples, second die 228 enables dimensional control of the three-dimensional object built during the deposition process using additive manufacturing system 110, for example, laterally opposite die 128. Control of material flow using second die 228 enables control of at least one dimension (e.g., a lateral dimension) of each layer of extrudate 112 being deposited. In other words, second die 228 prevents extrudate 112 from extending beyond a desired dimension and inhibits a build-up of excess material along a periphery (e.g., an external boundary of a surface) of the layer of extrudate 112 being deposited.

Further, in one or more examples, second die 228 enables control of a contour and/or control of surface characteristics of the periphery (e.g., side surface) of the layer of extrudate 112 being deposited, for example, laterally opposite die 128. In one or more examples, second die 228 provides for a planar or contoured side surface of the layer of extrudate 112 being deposited. In one or more examples, second die 228 provides for a relatively smooth side surface of the layer of extrudate 112 being deposited.

In one or more examples, second die 228, die 128, and stirring tool 118 move together when depositing a layer of extrudate 112, for example, by transverse movement of deposition head 116. In one or more examples, second die 228, die 128, and stirring tool 118 move independently. In such examples, second die 228 and die 128 moves into position, followed by transverse movement of stirring tool 118 to deposit the layer of extrudate 112.

As illustrated in FIGS. 4 and 5, in one or more examples, second shortest distance 236 between die 128 and outer surface 134 is at most 3 millimeters. In one or more examples, shortest distance 136 between die 128 and outer surface 134 is at most 1 millimeter. It should be appreciated that shortest distance 136 between second die 228 and outer surface 134 of stirring tool 118 depends on various factors, including, but not limited to, the desired (e.g., lateral) dimension of the layer of extrudate 112 being deposited along any given run of deposition head 116 or the desired (e.g., lateral) dimensions of the three-dimensional object.

As illustrated in FIGS. 4, 5, 9, and 10, in one or more examples, second-die distal end 230 axially protrudes distance $D_2$ beyond tool distal end 120. Second-die distal end 230 of second die 228 protruding axially, for example, along second-die axis $A_{D2}$ of second die 228, distance $D_2$ beyond tool distal end 120 locates a portion of second die 228 in position to at least one of form a portion of the layer of extrudate 112 being deposited, control a dimension of a portion of the layer of extrudate 112 being deposited, and/or control a surface characteristic of a portion of the layer of extrudate 112 being deposited In one or more examples, distance $D_2$ is equal to or greater than a thickness dimension of the layer of extrudate 112 being deposited. In such examples, a portion of second die 228 is suitably positioned to control radial material flow from the deposition interface between stirring tool 118 and build material and to form a side surface of the layer of extrudate 112 being deposited.

In one or more example, distance D of die 128 and distance $D_2$ of second die 228 are equivalent during deposition of any given layer of extrudate 112. In one or more example, distance D of die 128 and distance $D_2$ of second die 228 are different during deposition of any given layer of extrudate 112.

In one or more examples, second die 228 is formed of a third metallic material, having a third composition. In one or more examples, the third composition of the third metallic material of second die 228 and the second composition of the second metallic material of stirring tool 118 are equivalent to each other. In one or more examples, the third composition of the third metallic material of second die 228 and the first composition of the first metallic material of die 128 are equivalent to each other.

Generally, in one or more examples, the third composition of the third metallic material selected for second die 228 is harder than the material composition of feedstock 126 so that second die 228 is not consumed during the friction stir deposition process. In other words, second die 228 is a non-consumable tool.

As illustrated in FIGS. 4, 5, 9, and 10, in one or more examples, second die 228 is movable relative to stirring tool 118 along second-die axis $A_{D2}$ between, inclusively, at least a retracted position and an engaged position. Second-die distal end 230 protrudes axially outward distance $D_2$ beyond tool distal end 120 when second die 228 is in the engaged position. Movement of second die 228 relative to stirring tool 118 between the retracted position and the engaged position enables selective control of a flow-inhibiting function of second die 228 and/or surface-forming function of second die 228 when rotationally moving stirring tool 118 or moving deposition head 116 during deposition of extrudate 112.

For illustrative purposes, FIGS. 4, 5, 9, and 10 depict second die 228 in the engaged position and FIG. 5 depicts second die 228 in the retracted position (shown by broken lines). In one or more examples, second die 228 moves along second-die axis $A_{D2}$ from the retracted position to the engaged position so that second-die distal end 230 of second die 228 protrudes distance $D_2$ beyond tool distal end 120 of stirring tool 118, as depicted in FIG. 5. When in the engaged position, second die 228 is suitably located to engage a periphery (e.g., a side surface) of the layer of extrudate 112 being deposited for performance of its flow-inhibiting function and/or its surface-forming function. In one or more examples, second die 228 moves along second-die axis $A_{D2}$ from the engaged position to the retracted position so that second-die distal end 230 of second die 228 is approximately aligned with tool distal end 120 of stirring tool 118. When in the retracted position, second die 228 is suitably located not to engage a periphery (e.g., a side surface) of the layer of extrudate 112 being deposited.

In one or more examples, die force applicator 140 (FIG. 1) is operatively connected to second die 228 to selectively move second die 228 along second-die axis $A_{D2}$ between at least the retracted position and the engaged position.

As illustrated in FIGS. 7-9, in one or more examples, second die 228 includes second engagement surface 231 that defines at least one second shaping feature, such as at least one shaping feature 133, illustrated in FIG. 8.

Referring generally to FIG. 1 and particularly to, e.g., FIG. 10, second die 228 is rotatable about second-die axis $A_{D2}$. The preceding subject matter of this paragraph characterizes example 23 of the present disclosure, wherein example 23 also includes the subject matter according to example 22, above.

Rotating second die 228 about die axis $A_{D2}$ enables second die 228 to assist in formation of any layer of extrudate 112 during deposition.

In one or more examples, during the additive friction stir deposition process using additive manufacturing system 110, second die 228 rapidly rotates to generate heat through dynamic contact friction between second die 228 (e.g., second engagement surface 231 of second die 228) and a portion of the layer of extrudate 112 being deposited. In one or more examples, generation of heat proximate to the periphery of the layer of extrudate 112 being deposited improves the quality of the three-dimensional object built using additive manufacturing system 110.

In one or more examples, during the additive friction stir deposition process using additive manufacturing system 110, second die 228 rotates to smooth or otherwise shape at least a portion of the periphery (e.g., side surface) of the layer of extrudate 112 being deposited.

In one or more examples, second die 128 has an approximately cylindrical shape, or an approximately circular shape in cross-section, viewed along die axis $A_{D2}$.

In one or more examples, die-rotation device 142 (FIG. 1) is operatively connected to second die 228 to rotate second die 228 about second-die axis $A_{D2}$.

Referring generally to FIG. 1 and particularly to, e.g., FIG. 10, die 128 is rotatable in first direction $R_1$ about die axis $A_{D1}$, and second die 228 is rotatable in second direction $R_2$ about second-die axis $A_{D2}$. First direction $R_1$ and second direction $R_2$ are opposite to each other. The preceding subject matter of this paragraph characterizes example 24 of the present disclosure, wherein example 24 also includes the subject matter according to example 23, above.

Rotation of die 128 in first direction $R_1$ and rotation of second die 228 in second direction $R_2$ that is opposite to first direction $R_1$ mitigates, or offsets, the effect of torque applied to deposition head 116 or pull on deposition head 116 due to frictional contact between die 128 and/or second die 228 and extrudate 112 during respective rotation of die 128 and/or second die 228.

Referring generally to FIG. 12 and particularly to, e.g., FIGS. 1-11, method 1000 of depositing extrudate 112 onto substrate 114 is disclosed. Method comprises (Block 1002) rotating stirring tool 118 about axis of rotation $A_R$ while urging tool distal end 120 of stirring tool 118 against substrate 114. Stirring tool 118 defines bore 124, extending therethrough. Method 1000 further comprises (Block 1004) positioning die 128 adjacent to stirring tool 118, such that stirring tool 118 rotates relative to die 128. Method 1000 also comprises (Block 1006) passing feedstock 126 through bore 124 toward tool distal end 120. The preceding subject matter of this paragraph characterizes example 25 of the present disclosure.

Method 1000 facilitates depositing layers of extrudate 112 onto substrate 114 to form a three-dimensional object. Die 128 provides at least one of a flow-inhibiting function and a surface-forming function for controlling geometry and/or dimensions of a side, or a surface, of extrudate 112 when depositing extrudate 112 on substrate 114.

According to method 10000, in one or more examples, feedstock 126 is delivered through bore 124 of stirring tool 118. The step of (Block 1002) rapidly rotating stirring tool 118 generates heat through dynamic contact friction at a tool-material interface. Heat is generated by dynamic contact friction between stirring tool 118 and build material.

Heat is dissipated by plastic deformation of the build material. Heat is transferred inside the build material by thermal conduction and thermal convection via material flow.

As illustrated in FIGS. 2, 3, and 6, transverse motion of stirring tool 118, for example, in the direction of directional arrow 200, results in deposition of a single track, or a single layer, of extrudate 112. As best illustrated in FIGS. 4, 5, 9, and 10, a three-dimensional object is made by selectively adding subsequent layers of extrudate 112 upon preceding layers of extrudate 112 (e.g., three layers of extrudate 112 are depicted in FIGS. 4, 5, 9, and 10).

In one or more examples, surface quality of at least one layer of, or each layer of, extrudate 112 and, thus, surface quality of at least a portion of the three-dimensional object, or the three-dimensional object as a whole, is improved by use of die 128. According to method 1000, during the deposition process, a portion of plasticized build material (e.g., softened portions of a current layer of extrudate 112 being deposited and a previous layer of extrudate 112 on which the current layer of extrudate 112 is deposited or substrate 114 on which the current layer of extrudate 112 is deposited) flows radially outward from a deposition interface (e.g., the interface between stirring tool 118 and the build material). The step of (Block 1004) positioning die 128 relative to stirring tool 118, or relative to the deposition interface between stirring tool 118 and the build material, controls a material flow of plasticized build material that radiates outward from the deposition interface. In other words, die 128 serves as a physical stop for a radial flow of plasticized build material In one or more examples, die 128 and stirring tool 118 move together when depositing a layer of extrudate 112, for example, by transverse movement of deposition head 116. In one or more examples, die 128 and stirring tool 118 move independently. In such examples, die 128 moves into position, followed by transverse movement of stirring tool 118 to deposit the layer of extrudate 112.

Referring generally to FIG. 12 and particularly to, e.g., FIGS. 1-6, 9, and 10, according to method 1000, feedstock 126 forms extrudate 112 upon exiting tool distal end 120. The preceding subject matter of this paragraph characterizes example 26 of the present disclosure, wherein example 26 also includes the subject matter according to example 25, above.

Heated and softened, feedstock 126 is fed through bore 124 of stirring tool 118 and exits tool distal end 120 of stirring tool 118 as extrudate 112 and bonds with substrate 114, or preceding layer of extrudate 112, through plastic deformation at the deposition interface.

Referring generally to FIG. 12 and particularly to, e.g., FIGS. 1-6, 9, and 10, according to method 1000, die 128 is positioned to inhibit movement of extrudate 112 radially outward, relative to axis of rotation $A_R$. The preceding subject matter of this paragraph characterizes example 27 of the present disclosure, wherein example 27 also includes the subject matter according to example 26, above.

Positioning die 128 radially outward relative to axis of rotation $A_R$ of stirring tool 118 enables selective control of a flow-inhibiting function of die 128 and/or surface-forming function of die 128 when rotationally moving stirring tool 118 or moving deposition head 116 during deposition of extrudate 112.

According to method 1000, in one or more examples, (Block 1004) positioning die 128 and (Block 1010) moving die 128 into the engaged position enables dimensional control of the three-dimensional object built during the deposition process using additive manufacturing system 110. Control of material flow using die 128 enables control of at least one dimension (e.g., a lateral dimension) of each layer of extrudate 112 being deposited. In other words, die 128 prevents extrudate 112 from extending beyond a desired dimension and inhibits a build-up of excess material along a periphery (e.g., an external boundary of a surface) of the layer of extrudate 112 being deposited.

According to method 1000, in one or more examples, (Block 1004) positioning die 128 and (Block 1010) moving die 128 into the engaged position also enables control of a contour and/or control of surface characteristics of the periphery (e.g., side surface) of the layer of extrudate 112 being deposited. In one or more examples, die 128 provides for a planar or contoured side surface of the layer of extrudate 112 being deposited. In one or more examples, die 128 provides for a relatively smooth side surface of the layer of extrudate 112 being deposited.

Referring generally to FIG. 12 and particularly to, e.g., FIGS. 1 and 4, according to method 1000, (Block 1004) positioning die 128 adjacent to stirring tool 118 comprises (Block 1008) positioning die 128 such that die distal end 130 of die 128 protrudes axially outward distance D beyond tool distal end 120. The preceding subject matter of this paragraph characterizes example 28 of the present disclosure, wherein example 28 also includes the subject matter according to any one of examples 25 to 27, above.

Positioning die 128 so that die distal end 130 of die 128 protrudes axially, for example, along die axis $A_{D1}$ of die 128, distance D beyond tool distal end 120 suitably locates a portion of die 128 in position to at least one of form a portion of the layer of extrudate 112 being deposited, control a dimension of a portion of the layer of extrudate 112 being deposited, and/or control a surface characteristic of a portion of the layer of extrudate 112 being deposited.

In one or more examples, distance D is equal to or greater than a thickness dimension of the layer of extrudate 112 being deposited. In such examples, a portion of die 128 is suitably positioned to control radial material flow from the deposition interface between stirring tool 118 and build material and to form a side surface of the layer of extrudate 112 being deposited.

Referring generally to FIG. 12 and particularly to, e.g., FIGS. 1, 4, 5, 9, and 10, according to method 1000, die 128 is movable relative to stirring tool 118 along die axis $A_{D1}$ between at least the retracted position and the engaged position. Method 1000 further comprises (Block 1010) moving die 128 along die axis $A_{D1}$ to the engaged position prior to (Block 1006) passing feedstock 126 through bore 124 toward tool distal end 120. The preceding subject matter of this paragraph characterizes example 29 of the present disclosure, wherein example 29 also includes the subject matter according to any one of examples 25 to 28, above.

Moving die 128 relative to stirring tool 118 between the retracted position and the engaged position enables selective control of a flow-inhibiting function of die 128 and/or surface-forming function of die 128 when rotationally moving stirring tool 118 or moving deposition head 116 during deposition of extrudate 112.

Referring generally to FIG. 12 and particularly to, e.g., FIG. 1, according to method 1000, (Block 1010) moving die 128 along die axis $A_{D1}$ to engaged position comprises (Block 1012) actuating at least one of a pneumatic linear actuator, a hydraulic linear actuator, or a mechanical linear actuator. The preceding subject matter of this paragraph characterizes example 30 of the present disclosure, wherein example 30 also includes the subject matter according to example 29, above.

Actuating at least one of the pneumatic linear actuator, the hydraulic linear actuator, or the mechanical linear actuator provides a simple, effective, and repeatable means of selectively positioning die 128 along die axis $A_{D1}$ relative to stirring tool 118, between at least the retracted position and the engaged position.

Referring generally to FIG. 12 and particularly to, e.g., FIGS. 1 and 10, method 1000 further comprises (Block 1014) rotating die 128 about die axis $A_{D1}$. The preceding subject matter of this paragraph characterizes example 31 of the present disclosure, wherein example 31 also includes the subject matter according to any one of examples 25 to 30, above.

Rotating die 128 about die axis $A_{D1}$ enables die 128 to assist in formation of any layer of extrudate 112 during deposition.

According to method 1000, in one or more examples, (Block 1014) rotating die 128 generates heat through dynamic contact friction between die 128 (e.g., engagement surface 131 of die 128) and a portion of the layer of extrudate 112 being deposited. In one or more examples, generation of heat proximate to the periphery of the layer of extrudate 112 being deposited improves the quality of the three-dimensional object built using additive manufacturing system 110.

According to method 1000, in one or more examples, (Block 1014) rotating die 128 shape at least a portion of the periphery (e.g., side surface) of the layer of extrudate 112 being deposited.

Referring generally to FIG. 12 and particularly to, e.g., FIGS. 1-6 and 9-11, method 1000 further comprises (Block 1016) positioning second die 228 adjacent to stirring tool 118, such that stirring tool 118 rotates relative to second die 228. The preceding subject matter of this paragraph characterizes example 32 of the present disclosure, wherein example 32 also includes the subject matter according to example 31, above.

Positioning second die 228 provides at least one of a flow-inhibiting function and a surface-forming function for controlling geometry and/or dimensions of a second side, or second surface, of extrudate 112 when depositing extrudate 112 on substrate 114.

According to method 1000, in one or more example, (Block 1016) positioning second die 228 positions second die 228 radially outward relative to axis of rotation $A_R$ of stirring tool 118 and enables selective control of a flow-inhibiting function of second die 228 and/or surface-forming function of second die 228 when rotationally moving stirring tool 118 or moving deposition head 116 during deposition of extrudate 112. In one or more examples, (Block 1016) positioning second die 228 positions second die 228 so that second-die distal end 230 of second die 228 protrudes axially, for example, along second-die axis $A_{D2}$ of second die 228, distance $D_2$ beyond tool distal end 120 suitably locates a portion of second die 228 in position to at least one of form a portion of the layer of extrudate 112 being deposited, control a dimension of a portion of the layer of extrudate 112 being deposited, and/or control a surface characteristic of a portion of the layer of extrudate 112 being deposited.

Referring generally to FIG. 12 and particularly to, e.g., FIGS. 1 and 10, method 1000 further comprises (Block 1018) rotating second die 228 about second-die axis $A_{D2}$. The preceding subject matter of this paragraph characterizes example 33 of the present disclosure, wherein example 33 also includes the subject matter according to example 32, above.

Rotating second die 228 about second-die axis $A_{D2}$ enables second die 228 to assist in formation of any layer of extrudate 112 during deposition.

According to method 1000, in one or more examples, (Block 1018) rotating second die 228 generates heat through dynamic contact friction between second die 228 (e.g., second engagement surface 231 of second die 228) and a portion of the layer of extrudate 112 being deposited. In one or more examples, generation of heat proximate to the periphery of the layer of extrudate 112 being deposited improves the quality of the three-dimensional object built using additive manufacturing system 110.

According to method 1000, in one or more examples, (Block 1018) rotating second die 228 shapes at least a portion of the periphery (e.g., side surface) of the layer of extrudate 112 being deposited.

Referring generally to FIG. 12 and particularly to, e.g., FIGS. 1 and 10, according to method 1000, (Block 1018) rotating second die 228 about second-die axis $A_{D2}$ comprises (Block 1020) rotating second die 228 in second direction $R_2$ about second-die axis $A_{D2}$, while die 128 rotates in first direction $R_1$ about die axis $A_{D1}$. Second direction $R_2$ and first direction $R_1$ are opposite to each other. The preceding subject matter of this paragraph characterizes example 34 of the present disclosure, wherein example 34 also includes the subject matter according to example 33, above.

Rotating die 128 in first direction $R_1$ and rotating second die 228 in second direction $R_2$ that is opposite to first direction $R_1$ mitigates, or offsets, the effect of torque applied to deposition head 116 or pull on deposition head 116 due to frictional contact between die 128 and/or second die 228 and extrudate 112 during respective rotation of die 128 and/or second die 228.

Referring generally to FIG. 12 and particularly to, e.g., FIGS. 1-3 and 6, method 1000 further comprises (Block 1022) causing axis of rotation $A_R$ of stirring tool 118 to move relative to substrate 114. The preceding subject matter of this paragraph characterizes example 35 of the present disclosure, wherein example 35 also includes the subject matter according to any one of examples 25 to 34, above.

Moving axis of rotation $A_R$ of stirring tool 118 relative to substrate 114, for example, in the direction of directional arrow 200, results in deposition of a track, or a layer, of extrudate 112.

Referring generally to FIG. 12 and particularly to, e.g., FIG. 1, aircraft component, manufactured according to method 1000 is disclosed. The preceding subject matter of this paragraph characterizes example 36 of the present disclosure, wherein example 36 also includes the subject matter according to any one of examples 25 to 35, above.

Aircraft component is an example of a three-dimensional object additively manufactured according to method 1000 an using additive manufacturing system 100.

Examples of the present disclosure may be described in the context of aircraft manufacturing and service method 1100 as shown in FIG. 13 and aircraft 1102 as shown in FIG. 14. During pre-production, illustrative method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116).

Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the apparatus(es), method(s), or combination thereof may be utilized during production stages (Blocks 1108 and 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (Block 1114) and/or during maintenance and service (Block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An additive manufacturing system for depositing an extrudate onto a substrate, the additive manufacturing system comprising a deposition head that comprises:
   a stirring tool, rotatable about an axis of rotation $A_R$ and comprising a tool distal end and a tool proximal end, axially opposing the tool distal end along the axis of rotation $A_R$, wherein the stirring tool defines a bore, extending from the tool proximal end to the tool distal end, and the bore is configured to receive feedstock, biased toward the tool distal end; and
   a die, which is positioned adjacent to the stirring tool, defines a die axis $A_{D1}$, and comprises a die distal end and a die proximal end, axially opposing the die distal end along the die axis $A_{D1}$, wherein the die axis $A_{D1}$ is parallel to the axis of rotation $A_R$ of the stirring tool, and the stirring tool is rotatable relative to the die about the axis of rotation $A_R$.

2. The additive manufacturing system according to claim 1, wherein the die distal end axially protrudes a distance D beyond the tool distal end.

3. The additive manufacturing system according to claim 1, wherein:
   the die is moveable relative to the stirring tool along the die axis $A_{D1}$ between, inclusively, at least a retracted position and an engaged position, and
   the die distal end protrudes axially outward a distance D beyond the tool distal end when the die is in the engaged position.

4. The additive manufacturing system according to claim 3, further comprising a die force applicator, operatively connected to the die to selectively move the die along the die axis $A_{D1}$ between at least the retracted position and the engaged position.

5. The additive manufacturing system according to claim 1, further comprising a stirring-tool force applicator, configured to urge the deposition head against the substrate.

6. The additive manufacturing system according to claim 5, further comprising a stirring-tool rotation device, configured to rotate the stirring tool about the axis of rotation $A_R$ while the stirring-tool force applicator urges the deposition head against the substrate.

7. The additive manufacturing system according to claim 1, further comprising a feed-stock force applicator that biases the feedstock toward the tool distal end.

8. The additive manufacturing system according to claim 1, further comprising a carriage, connected to the deposition head, and wherein the carriage moves the deposition head relative to the substrate.

9. The additive manufacturing system according to claim 1, wherein the die comprises an engagement surface that defines at least one shaping feature.

10. The additive manufacturing system according to claim 1, wherein the die is rotatable about the die axis $A_{D1}$.

11. The additive manufacturing system according to claim 10, further comprising a die-rotation device, operatively connected to the die to rotate the die about the die axis $A_{D1}$.

12. The additive manufacturing system according to claim 10, further comprising a second die, which is positioned adjacent to the stirring tool, defines a second-die axis $A_{D2}$, and comprises a second-die distal end and a second-die proximal end, axially opposing the second-die distal end along the second-die axis $A_{D2}$, and wherein the second-die axis $A_{D2}$ is parallel with the axis of rotation $A_R$ of the stirring tool.

13. The additive manufacturing system according to claim 12, wherein the second die is rotatable about the second-die axis $A_{D2}$.

14. The additive manufacturing system according to claim 13, wherein:
the die is rotatable in a first direction $R_1$ about the die axis $A_{D1}$ and the second die is rotatable in a second direction $R_2$ about the second-die axis $A_{D2}$; and
the first direction $R_1$ and the second direction $R_2$ are opposite to each other.

15. The additive manufacturing system according to claim 1, wherein:
the stirring tool comprises an outer surface, and
a shortest distance between the die and the outer surface is at most 3 millimeters.

16. The additive manufacturing system according to claim 1, wherein:
the stirring tool comprises an outer surface, and
a shortest distance between the die and the outer surface is at most 1 millimeter.

17. The additive manufacturing system according to claim 1, wherein the feedstock is received in the bore such that rotation of the stirring tool causes corresponding rotation of the feedstock.

18. The additive manufacturing system according to claim 1, wherein the feedstock comprises a metal or a metal alloy.

19. The additive manufacturing system according to claim 1, wherein:
the die is formed of a first metallic material, having a first composition;
the stirring tool is formed of a second metallic material, having a second composition; and
the first composition and the second composition are equivalent to each other.

20. An additive manufacturing system for depositing an extrudate onto a substrate, the additive manufacturing system comprising a deposition head that comprises:
a stirring tool, rotatable about an axis of rotation $A_R$ and comprising a tool distal end and a tool proximal end, axially opposing the tool distal end along the axis of rotation $A_R$, wherein the stirring tool comprises a bore, extending from the tool proximal end to the tool distal end, and the bore is configured to receive feedstock, biased toward the tool distal end; and
a die, which is positioned adjacent to the stirring tool, defines a die axis $A_{D1}$, and comprises a die distal end and a die proximal end, axially opposing the die distal end along the die axis $A_{D1}$, wherein the die axis $A_{D1}$ is parallel to the axis of rotation $A_R$ of the stirring tool, and the die distal end axially protrudes a distance D beyond the tool distal end.

* * * * *